US012590668B2

(12) United States Patent
Cox et al.

(10) Patent No.: US 12,590,668 B2
(45) Date of Patent: Mar. 31, 2026

(54) ADJUSTABLE SUPPORT

(71) Applicant: COLEBROOK BOSSON & SAUNDERS (PRODUCTS) LIMITED, London (GB)

(72) Inventors: Nicholas Cox, England (GB); Alex Lau, England (GB)

(73) Assignee: Colebrook Bosson & Saunders (Products) Limited, London (GB)

( * ) Notice: Subject to any disclaimer, the term of this patent is extended or adjusted under 35 U.S.C. 154(b) by 0 days.

(21) Appl. No.: 18/473,019

(22) Filed: Sep. 22, 2023

(65) Prior Publication Data

US 2024/0102604 A1 Mar. 28, 2024

Related U.S. Application Data

(60) Provisional application No. 63/409,113, filed on Sep. 22, 2022.

(51) Int. Cl.
*F16M 11/04* (2006.01)
*F16M 11/18* (2006.01)

(52) U.S. Cl.
CPC ........... *F16M 11/046* (2013.01); *F16M 11/18* (2013.01)

(58) Field of Classification Search
CPC ...... F16M 11/046; F16M 11/18; F16M 11/24; F16M 11/10
See application file for complete search history.

(56) References Cited

U.S. PATENT DOCUMENTS

| | | | | | |
|---|---|---|---|---|---|
| 3,012,363 | A | * | 12/1961 | Sautereau | A47B 27/14 108/4 |
| 5,469,793 | A | * | 11/1995 | Lindsay | F16M 11/24 108/2 |
| 6,286,794 | B1 | * | 9/2001 | Harbin | F16M 11/2064 248/281.11 |
| D662,398 | S | * | 6/2012 | Jahnke | D8/355 |
| D834,028 | S | | 11/2018 | Wu | |

(Continued)

FOREIGN PATENT DOCUMENTS

| | | | | | |
|---|---|---|---|---|---|
| CN | 112145915 | A | * | 12/2020 | ........... F16M 11/041 |
| GB | 1240837 | A | * | 7/1971 | |

(Continued)

OTHER PUBLICATIONS

Herman Miller wishbone monitor arms online product page dated by web.archive.org at Aug. 2, 2021 https://www.hermanmiller.com/products/accessories/technology-support/wishbone-monitor-arms/ (Year: 2021).*

(Continued)

*Primary Examiner* — Terrell L McKinnon
*Assistant Examiner* — Ding Y Tan
(74) *Attorney, Agent, or Firm* — Michael Best & Friedrich LLP

(57) ABSTRACT
An adjustable support for an electronic device including a platform configured to support the electronic device, a post extending between a first end and a second end, a linkage assembly movably supporting the platform on the post, where the linkage assembly is slidably coupled to the post to adjust a height of the platform, and where the linkage assembly includes a plurality of movable linkages configured to adjust a tilt of the platform to a plurality of different tilt angles.

13 Claims, 23 Drawing Sheets

(56) References Cited

U.S. PATENT DOCUMENTS

| | | | |
|---|---|---|---|
| 10,690,282 B1 * | 6/2020 | Sierra Murillo | F16M 13/022 |
| D903,689 S | 12/2020 | Zheng | |
| D927,498 S | 8/2021 | Wang | |
| 11,112,057 B2 * | 9/2021 | Janechek | F16M 11/2042 |
| D953,341 S | 5/2022 | Shi | |
| D955,399 S | 6/2022 | Shi | |
| D965,601 S | 10/2022 | Chen | |
| D965,602 S | 10/2022 | Hu | |
| D991,938 S | 7/2023 | Serna et al. | |
| D993,964 S | 8/2023 | Guo | |
| D1,006,818 S | 12/2023 | Wang | |
| D1,019,660 S | 3/2024 | Wang | |
| D1,025,082 S | 4/2024 | Guo | |
| D1,027,967 S | 5/2024 | Liu | |
| D1,046,876 S | 10/2024 | Guo | |
| D1,053,882 S | 12/2024 | Liu | |
| D1,062,747 S | 2/2025 | Guo | |
| D1,072,496 S | 4/2025 | Zu | |
| D1,087,103 S | 8/2025 | Knapp et al. | |
| D1,094,359 S | 9/2025 | Zhou | |
| 2003/0001057 A1 * | 1/2003 | Sweere | G06F 1/1601 |
| | | | 248/276.1 |
| 2003/0001507 A1 | 1/2003 | Cao | |
| 2008/0099637 A1 * | 5/2008 | Pai | F16M 11/30 |
| | | | 248/157 |
| 2009/0179133 A1 * | 7/2009 | Gan | F16M 11/105 |
| | | | 248/422 |
| 2010/0213328 A1 * | 8/2010 | Smith | F16M 11/24 |
| | | | 248/220.21 |
| 2011/0023758 A1 * | 2/2011 | Overgaard | A47B 9/06 |
| | | | 108/147 |
| 2012/0019990 A1 * | 1/2012 | Segar | F16M 11/24 |
| | | | 361/679.01 |
| 2012/0181490 A1 * | 7/2012 | Guyard | B66F 3/00 |
| | | | 254/97 |
| 2013/0200240 A1 * | 8/2013 | Lindblad | F16M 13/022 |
| | | | 248/372.1 |
| 2021/0033243 A1 * | 2/2021 | Gold | F16M 11/2014 |
| 2021/0172562 A1 * | 6/2021 | Happel | F16M 11/18 |
| 2022/0095788 A1 * | 3/2022 | Chen | A47B 21/0314 |
| 2023/0151923 A1 * | 5/2023 | Brousseau | F16M 13/02 |
| | | | 248/205.1 |
| 2023/0417361 A1 * | 12/2023 | Matlin | F16M 11/041 |
| 2024/0102604 A1 | 3/2024 | Cox | |

FOREIGN PATENT DOCUMENTS

| | | | | |
|---|---|---|---|---|
| WO | WO-2015072824 A1 * | 5/2015 | | F16M 11/10 |
| WO | WO-2016195853 A1 * | 12/2016 | | F16M 11/046 |
| WO | WO-2020035099 A1 * | 2/2020 | | F16M 11/10 |

OTHER PUBLICATIONS

International Search Report and Written Opinion for Application No. PCT/US2023/033537 dated Feb. 5, 2024 (15 pages).
Laptop Stand. Besign, amazon.com (online) 4 pages. Posted Jan. 28, 2023. [Retrieved Jan. 29, 2026] https://a.co/d/96ociRS (Year: 2023).
Laptop Stand for Desk. Vecofo, amazon.com (online) 4 pages. Posted May 18, 2022. [Retrieved Jan. 29, 2026] https://www.amazon.comNECOFO-Ergonomic-Aluminum-Adjustable-Standing/dp/B0B1LM8L2Y?th=1 (Year: 2022).
CN App. No. 202430523368.0, Design Vision, publication date Mar. 21, 2025. Site visited Jan. 29, 2026. (Year: 2025).

* cited by examiner

ADJUSTABLE SUPPORT

CROSS-REFERENCE TO RELATED APPLICATIONS

This application claims priority to U.S. Provisional Patent Application No. 63/409,113 filed on Sep. 22, 2022, the entire contents of which are incorporated by reference herein.

BACKGROUND

The present invention relates to a support for a device, and more particularly, to an adjustable support for an electronic device.

Electronic devices such as laptops, tablets, or mobile phones are often used in a working environment. Typically, electronic devices are placed on support structures. It is often desired by users to adjust the height or location of the electronic device relative to the desktop to gain a better view of the electronic device. However, many support structures for electronic devices are difficult to adjust and require great effort by the user to adjust the height or location of the electronic device. Further, many support structures do not allow for a range of movement required for a full ergonomic solution and take a up a large amount of space on the desktop.

SUMMARY

The present application provides, in one aspect, an adjustable support for an electronic device including a platform configured to support the electronic device, a post extending between a first end and a second end, a linkage assembly movably supporting the platform on the post, where the linkage assembly includes a plurality of movable linkages configured to adjust a tilt of the platform to a plurality of different tilt angles.

The present application provides, in another aspect, an adjustable support for an electronic device including a platform configured to support the electronic device, a post extending between a first end and a second end, a linkage assembly movably supporting the platform on the post, where the linkage assembly is slidably coupled to the post to adjust a height of the platform, and where the linkage assembly includes a plurality of movable linkages configured to adjust a tilt of the platform to a plurality of different tilt angles.

The present application provides, in another aspect, an adjustable support for an electronic device including a platform configured to support the electronic device, a post extending between a first end and a second end, a linkage assembly movably supporting the platform on the post, where the linkage assembly is slidable along a longitudinal axis of the post to adjust the height of the platform, and where the linkage assembly includes a friction grip that allows the linkage assembly to be freely moveable in an upward direction and restricted from movement in a downward direction until an applied force overcomes a frictional force provided by the friction grip.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. It should be understood that the description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting.

Figure 1:
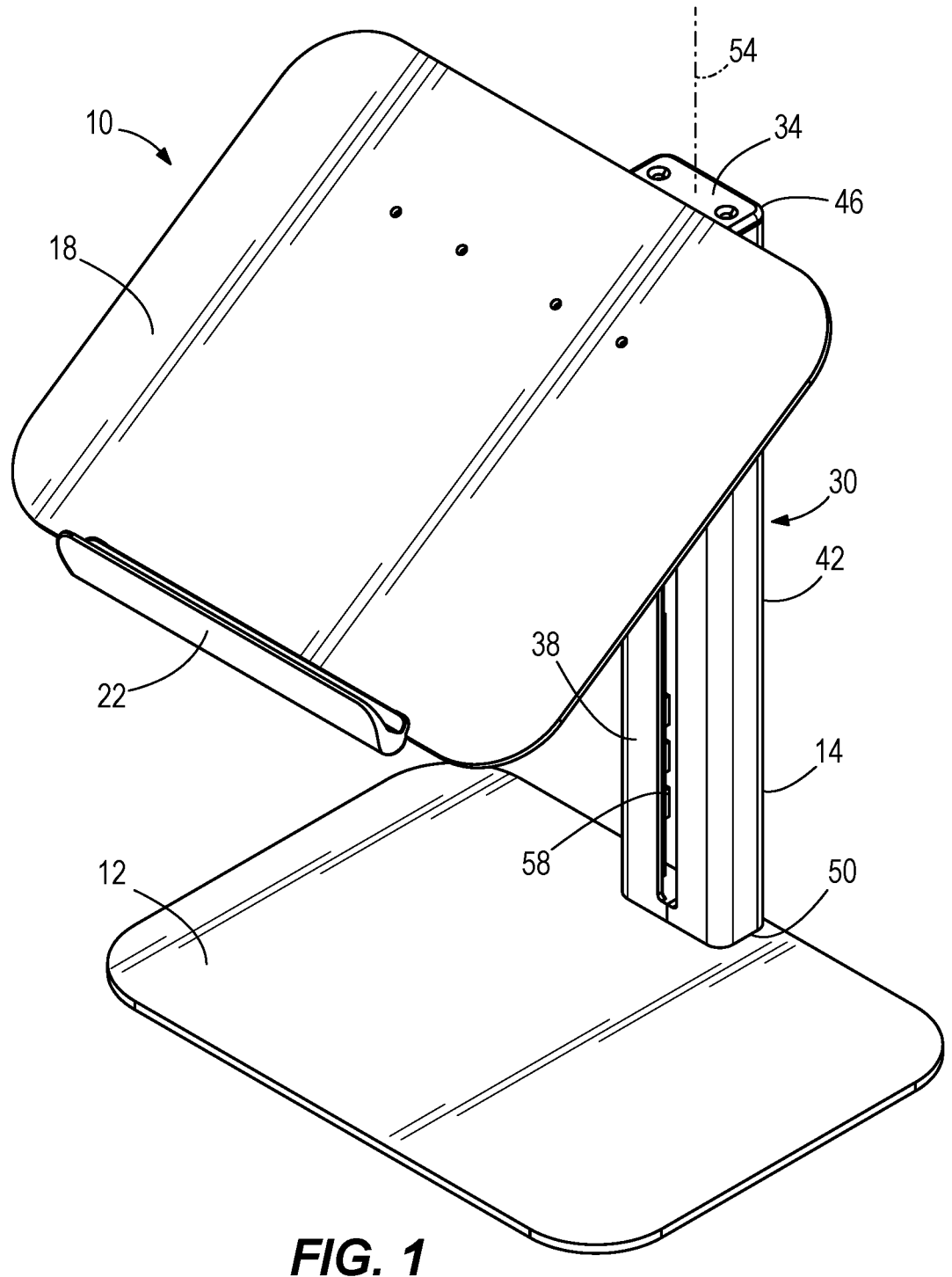
FIG. 1 is a top perspective view of an adjustable support attached to a base.

FIG. 1 illustrates an adjustable support 10 configured to support an electronic device such as a computer, a laptop, a tablet, a mobile phone, or other devices. The adjustable support 10 is coupled to a base 12. In some embodiments, the base 12 may include a horizontal base such as desktops, or tabletops. In other embodiments, the base 12 may be a separate platform, which may in turn, be supported on a desktop, tabletop, or other surface. In other embodiments, the base may include a vertical base such as a wall or post. Still, in other embodiments, the base may be a privacy booth or cubicle including a plurality of walls that defines an interior workspace area. The adjustable support 10 provides a full ergonomic solution to a user and minimizes the space the adjustable support 10 takes up on the desktop.

Figure 2:
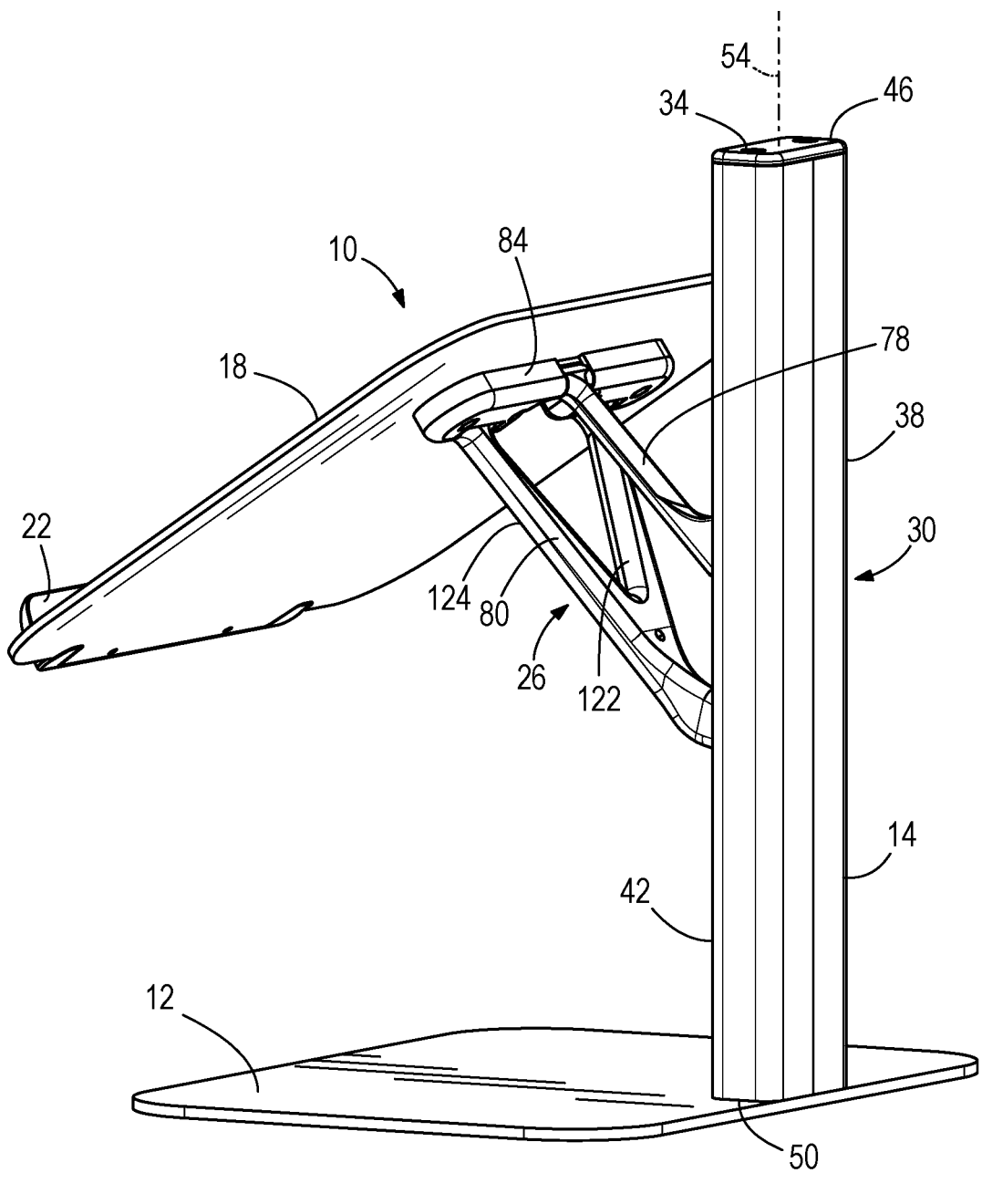
FIG. 2 is a rear perspective view of the adjustable support of FIG. 1.
Figure 12C:
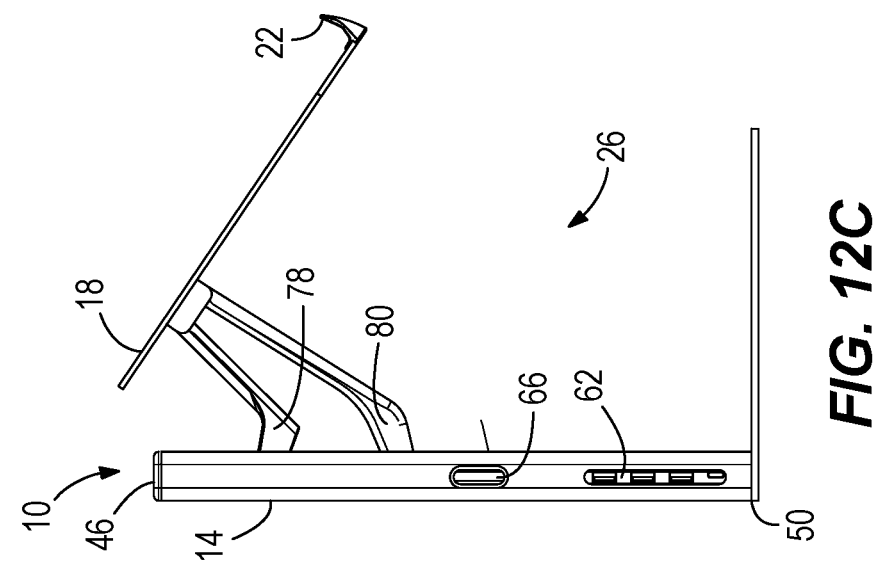
FIGS. 12A-12C is a side view of the adjustable support of FIG. 1 moving from a first position to a fourth position.
Figure 12B:
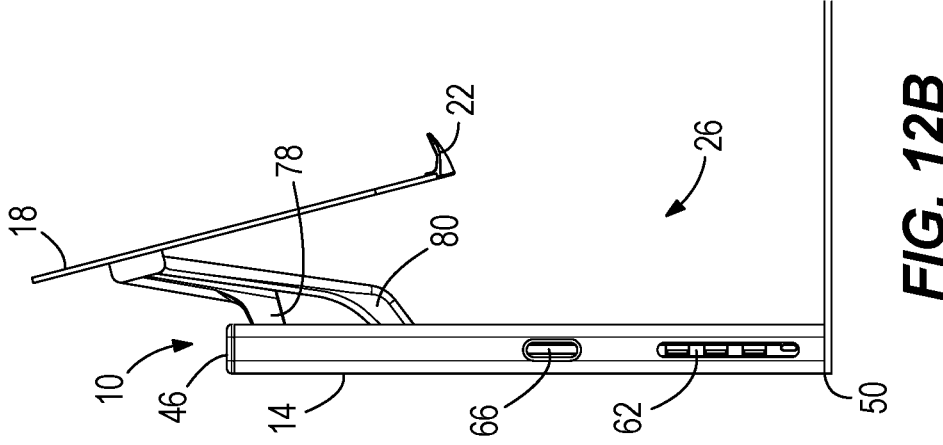
Figure 12A:
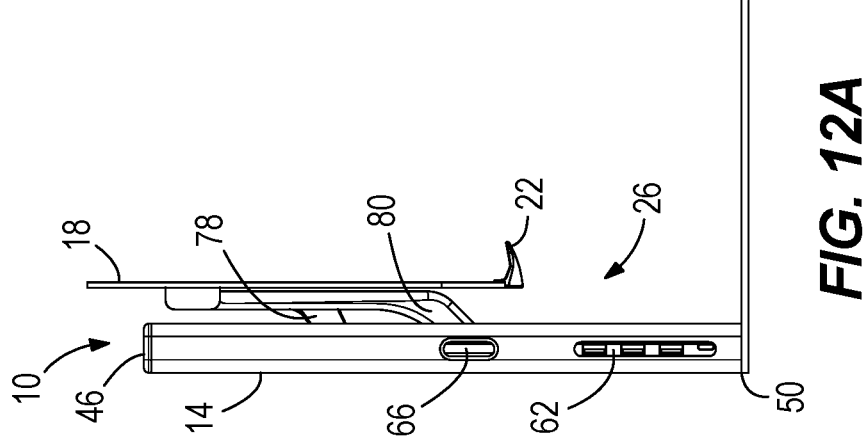

With reference to FIGS. 1 and 2, the adjustable support 10 includes a post 14, a platform 18 for supporting an electronic device, and a linkage assembly for adjusting the height and/or orientation of the platform. The post 14 is supported by the base 12, and the linkage assembly 26 is movably engaged with the post 14. The platform 18 is supported by the linkage assembly 26 and is movable relative to the post 14 by the linkage assembly 26. The linkage assembly 26 is capable of moving the platform 18 to different heights (i.e., in the vertical direction), and is capable of moving the platform 18 to different orientations (i.e., different tilt angles), as shown in FIGS. 12A-12C. In some embodiments, the platform 18 may optionally include a platform ledge 22 to provide further support for the electronic device and prevent the electronic device from sliding off of the platform 18.

An exemplary embodiment of the adjustable support 10 is described herein, with some aspects of the post 14, the platform 18, and the linkage assembly being optional features. The post 14 is formed as a hollow tube which may house other components of the adjustable support 10. In some embodiments, the post 14 is formed as a cylindrical or rectangular tube. The illustrated post 14 includes a post housing 30 having a post top plate 34, a post first housing portion 38, and a post second housing portion 42. The post top plate 34, the post first housing portion 38, and the post second housing portion 42 together define a post cavity 44. The post 14 includes a first end 46 and a second end 50 opposite the first end 46. A longitudinal axis 54 extends centrally through the post 14 between the first end 46 and the second end 50. The post 14 includes a length defined along the longitudinal axis 54 between the first end 46 and the second end 50.

Figure 3:
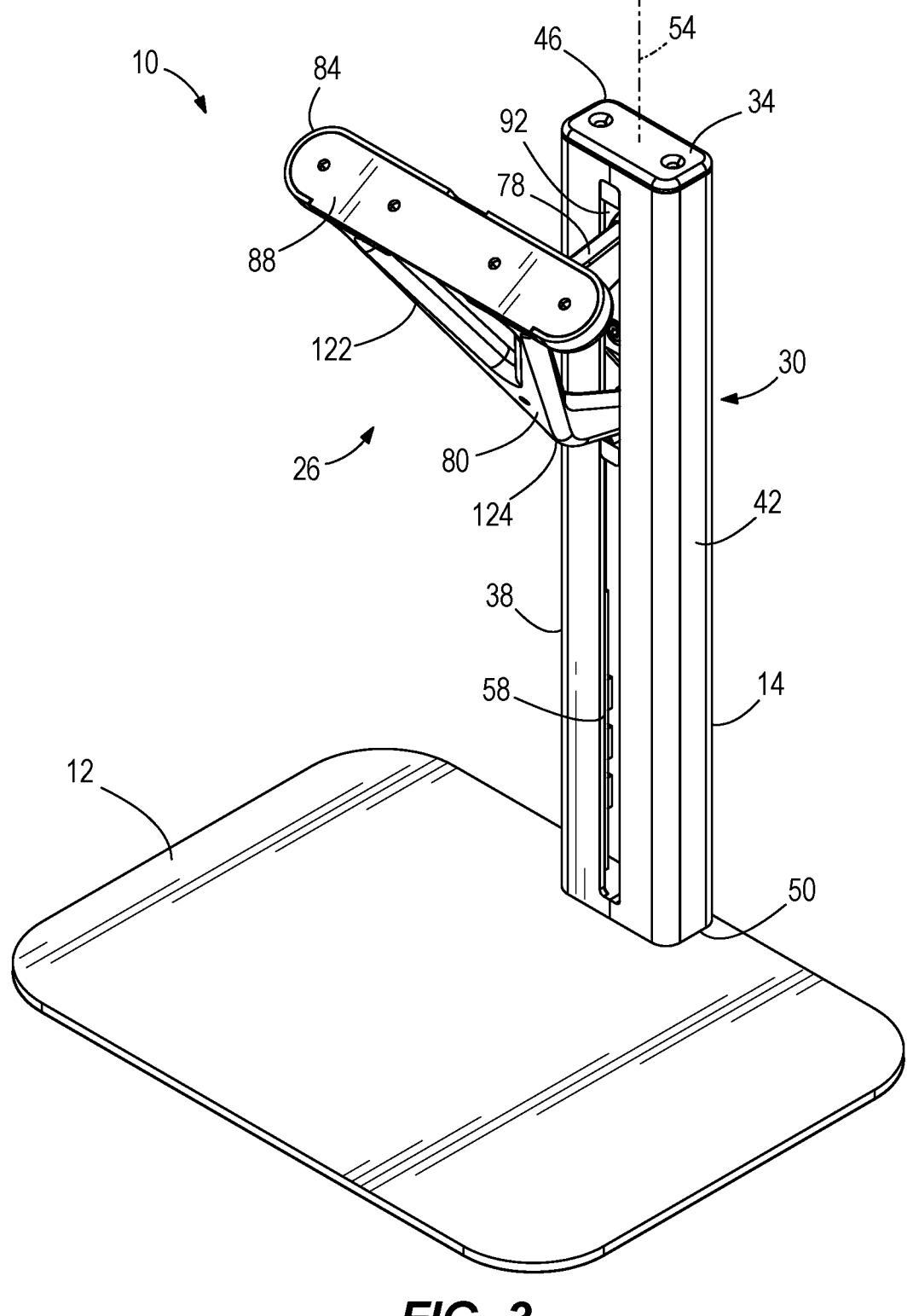
FIG. 3 is a top perspective view of the adjustable support of FIG. 1 with portions removed.
Figures 5, 6:
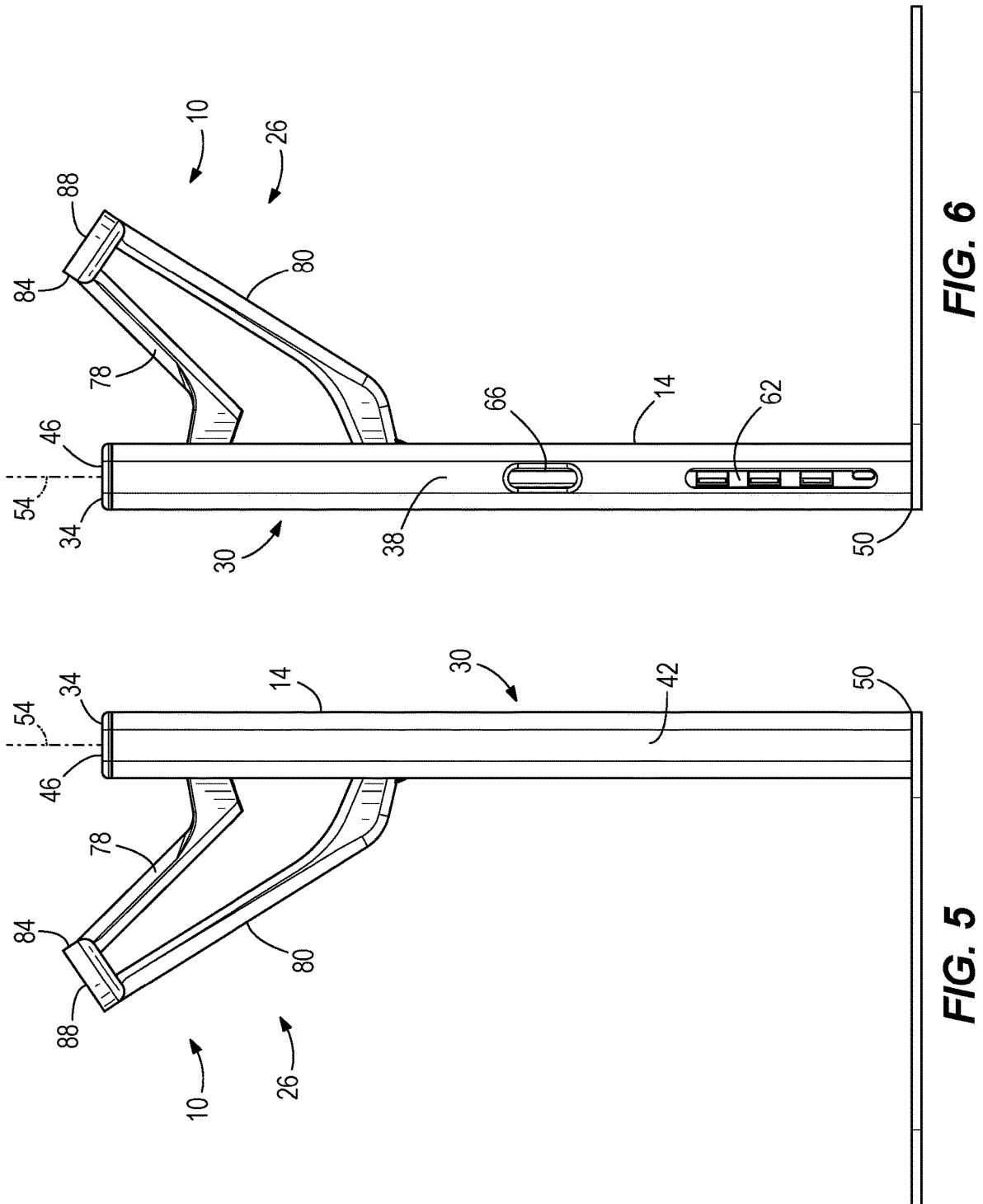
FIG. 5 is a right side view of the adjustable support to FIG. 3.
FIG. 6 is a left side view of the adjustable support of FIG. 3.

As shown in FIGS. 2 and 3, the post 14 defines a post slot 58. In in the illustrated embodiment, the post first housing portion 38 and the post second housing portion 42 define the post slot 58. In other embodiments, the post 14 may be formed by a singular housing having a slot 58. As described in more detail below, the linkage assembly 26 extends through the post slot 58 to a distal point away from the post 14 (FIGS. 3 and 5). In some embodiments, the post 14 may optionally include a printed circuit board (PCB) having a Universal Serial Bus (USB) port or power hub 62 to provide connectivity or power to an electronic device (FIG. 6). In some embodiments, the post 14 may optionally include an aperture 66 in the post first housing portion 38. In some embodiments, the aperture 66 provides a location for a USB or power cable to extend from the post housing 30 and be connected to an electronic device (not shown). In these embodiments, the USB or power cable may be connected to the USB or power hub 62 (not shown).

Figure 7:
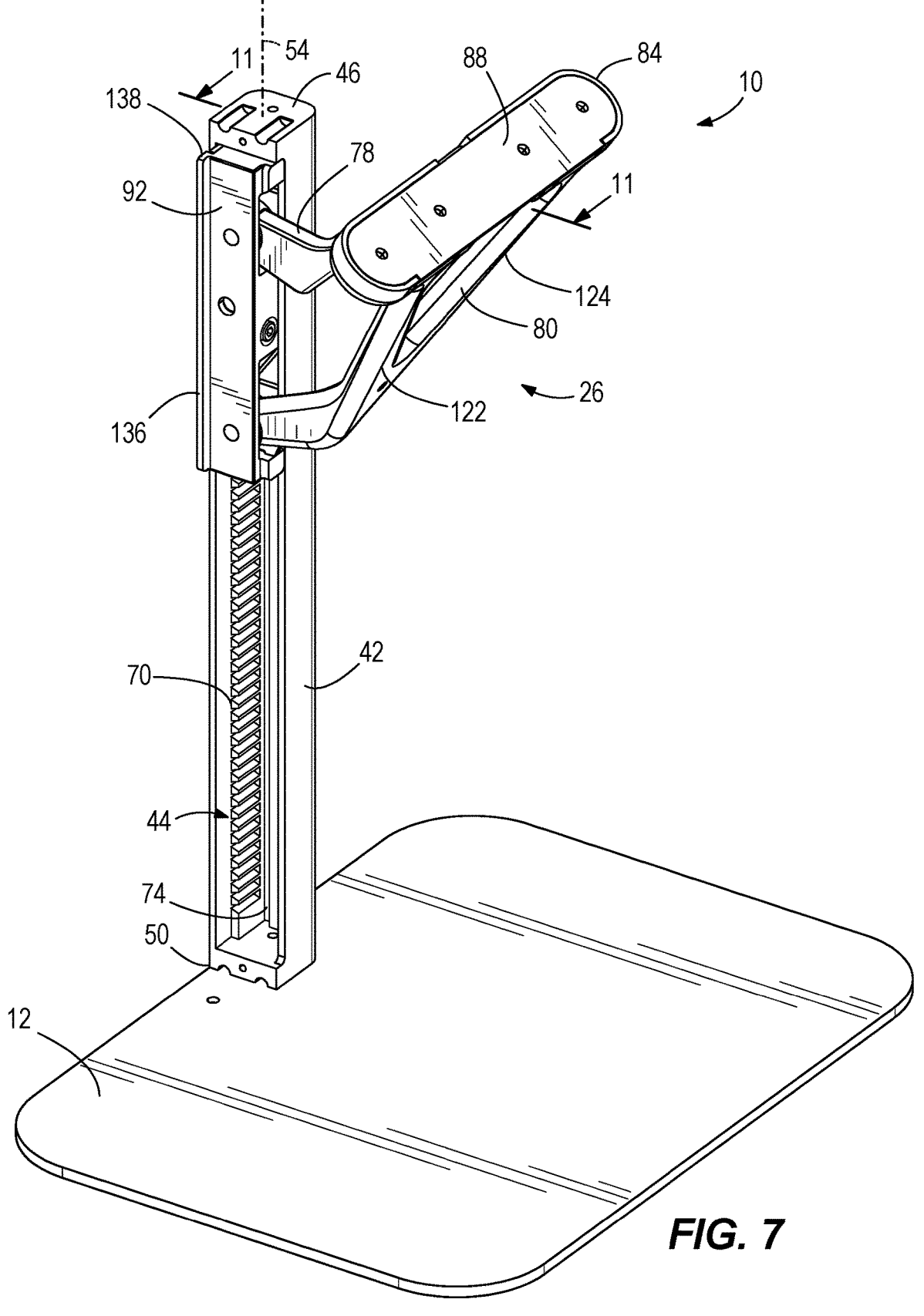
FIG. 7 is a side perspective view of the adjustable support of FIG. 3 with portions removed.

In some embodiments, the post 14 may optionally include a rack 70 located in the post 14, and in particular, in the post cavity 44 (FIG. 7). The rack 70 includes a plurality of teeth, which may be formed directly within one of the housing portions 38, 42. Alternatively the rack 70 may be a separate piece positioned within the post cavity 44. As will be described in further detail below, the racks 70 may be used to help create smooth and consistent movement of the linkage assembly 26. In addition or alternatively, the racks 70 may optionally be used to help maintain or restrict movement of the linkage assembly 26.

With continued reference to FIG. 7, the post 14 may also optionally include one or more track 74. The tracks 74 are located in the post 14, and in particular, the post cavity 44. The tracks 74 are defined as channels formed within the post 14 and extending in the direction of the longitudinal axis 54. The tracks 74 may extend along a majority of the length of the post 14 or only a partial length of the post 14 depending on the desired range of motion of the linkage assembly 26. In the illustrated embodiment, the post 14 defines two tracks 74. In other embodiments, the post 14 defines one or more tracks 74 (e.g., one, two, three, or four). The linkage assembly 26 includes rails 136 that engage the tracks 74 to guide movement of the linkage assembly 26 along the post 14 between the first end 46 and the second end 50. The tracks 74 and rails 136 may be used to help guide movement of the linkage assembly 26 in a linear direction along the longitudinal axis 54 and avoid "pinching" or "sticking" of the linkage assembly 26 as it slides along the post 14. In particular, since the linkage assembly 26 is cantilevered from the post 14, the linkage assembly 26 may lean forward and could create friction (i.e., sticking or pinching) that reduces the smoothness of the sliding movement of the linkage assembly 26. Accordingly, some embodiments of the adjustable support 10 may optionally include a track 74 and rail 136 to help alleviate some of the friction and stressed caused by the cantilevered arrangement. It should also be noted that in some embodiments, the rail 136 may be positioned within the post 14 and the track 74 may be positioned on the linkage assembly 26.

With reference back to FIGS. 1 and 2, the platform 18 is configured to support the electronic device above a surface. The platform 18 includes a square, rectangular, or other suitable shape that supports an electronic device. In some embodiments, the platform 18 may optionally include ridges or a grip surface to keep an electronic device on the platform 18. The platform 18 also includes the platform ledge 22 extending from the platform 18. The platform ledge 22 may also be referred to as a lip. The platform ledge 22 is configured to prevent an electronic device from sliding off the platform. In the illustrated embodiment, the platform ledge 22 may extend approximately ninety degrees relative to the platform 18. In other embodiments, the platform ledge 22 may extend obliquely relative to the platform 18.

The platform 18 supported on the post 14 by the linkage assembly 26. Specifically, the linkage assembly 26 helps enable movement of the platform 18 to different heights along the longitudinal axis 54. This is accomplished by moving the entire linkage assembly 26, and thus the platform 18, up or down with respect to the post 14. The linkage assembly 26 also enables pivoting movement of the platform 18 to different orientations. This is accomplished by moving the various linkages in the linkage assembly 26 to reorient the angle of the platform 18. In the illustrated embodiment, the linkage assembly 26 is a four bar linkage assembly, which is constructed from four links connected in a closed loop. The linkage assembly 26 is configured to tilt the platform 18 to different angles while maintaining a consistent center of gravity 184. As shown in FIGS. 13A to 13D, the center of gravity 184 (i.e., of the platform 18 and electronic device 180) is maintained generally along a linear horizontal path (i.e., a center of gravity line 188). In some embodiments, the center of gravity 184 (i.e., of the platform 18 and electronic device 180) may be maintained approximately plus or minus 5 mm relative to a linear horizontal path (e.g., a center of gravity line 188). By maintaining the center of gravity 184 generally along a linear horizontal path, the linkage assembly 26 is capable of balancing the platform 18 at a variety of tilt angles without the need for a robust locking assembly. However, in some embodiments, additional or optional locking features may be provided to assist the linkage assembly 26.

Figure 8:
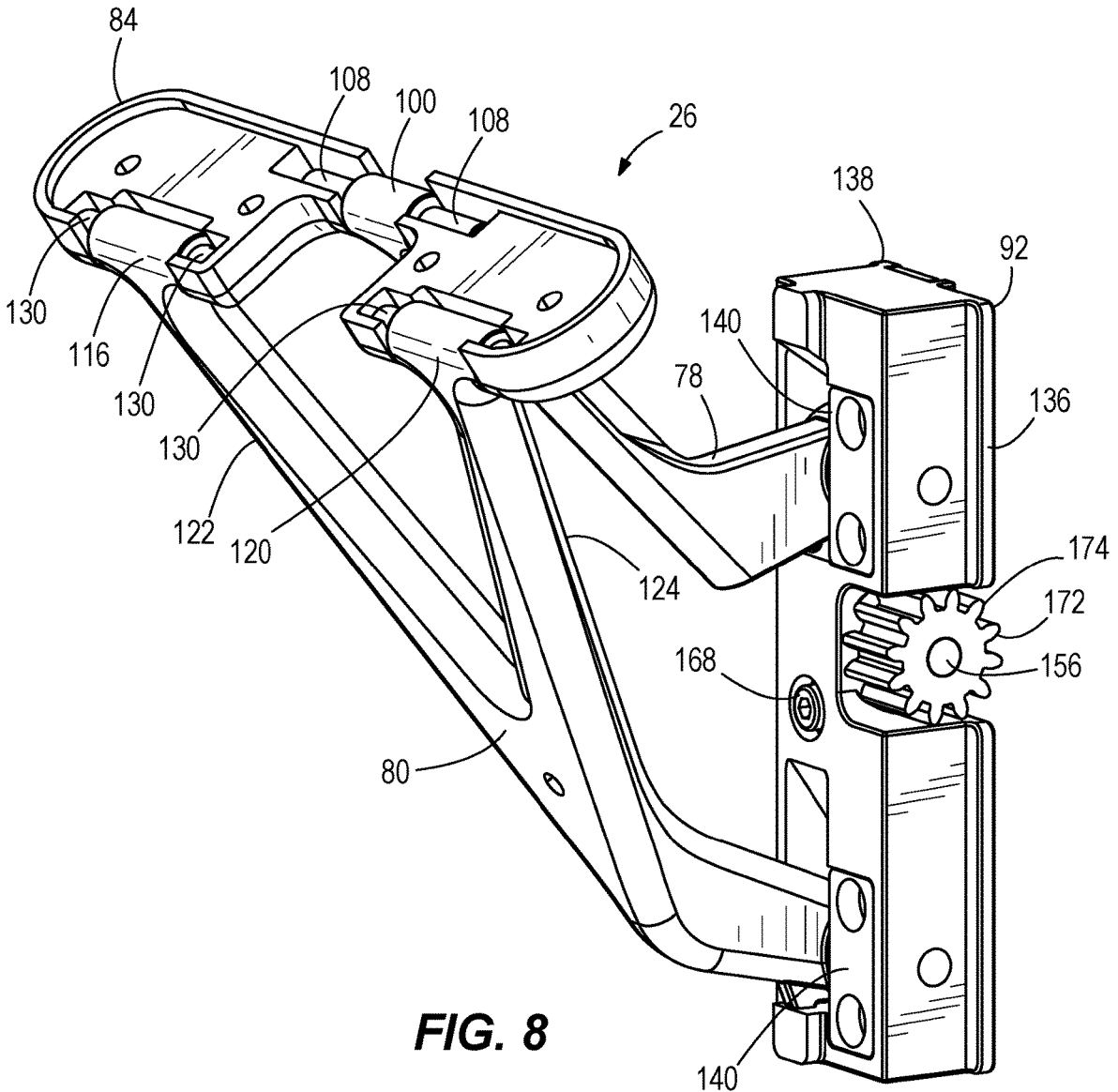
FIG. 8 is a side perspective view of an linkage assembly for the adjustable support of FIG. 3.

FIGS. 7 and 8 illustrate the linkage assembly 26 accordingly to an exemplary embodiment. The following description is exemplary and certain aspects and features of the linkage may differ in other embodiments. For example, the size, shape, and coupling mechanisms may differ between embodiments. It should be understood that there are a variety of different ways to create a four bar linkage assembly 26, which is capable of tilting the platform 18 as described. The illustrated embodiment of a linkage assembly 26 is a four bar linkage including a first arm 78, a second arm 80, a mount plate 84, and a carrier 92. The mount plate 84 is coupled directly to the platform 18. The carrier 92 is coupled to the post 14 and is capable of sliding vertically along the longitudinal axis 54. In the four bar linkage assembly 26, the carrier 92 is considered the "fixed link" in that it is not rotatable. The first arm 78 and second arm 80 extend between the carrier 92 and the mount plate 84, and are configured to move the mount plate 84 (and platform 18) relative to the carrier 92 and the post 14. Specifically, movement of the first arm 78 and the second arm 80 adjust the tilt angle of the platform 18. The first and second arm 78, 80 may be coupled to the mount plate 84 and the carrier 92 in a variety of different ways. The first and second arm 78, 80 may also have a variety of different shapes.

Figure 11:
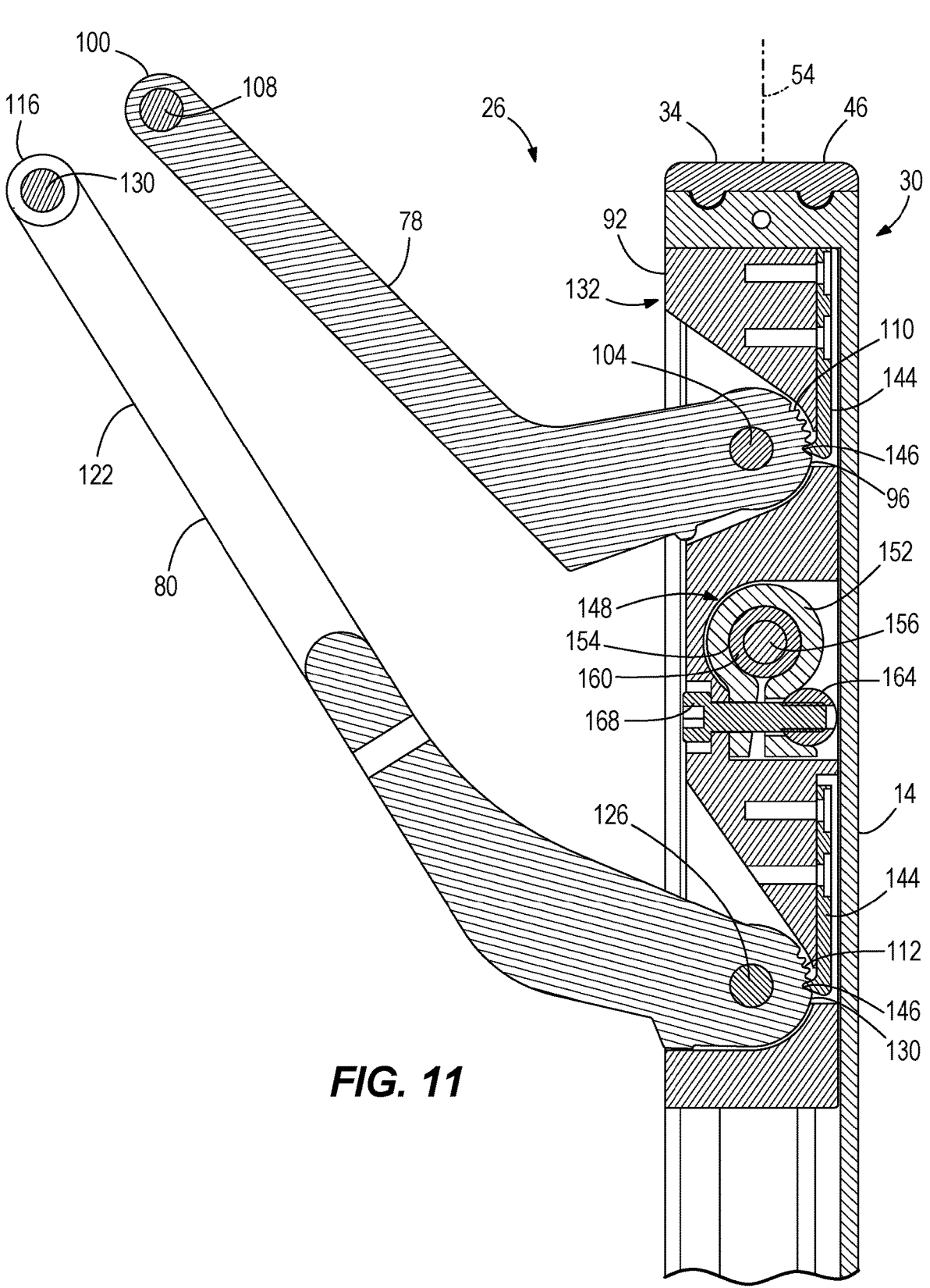
FIG. 11 is a cross sectional view of the adjustable support of FIG. 3 through line 11-11 of FIG. 7.

With continued reference to FIGS. 8 and 11, the first arm 78 includes a first end 96 and a second end 100 opposite the first end 96 (FIG. 11). In some embodiments, the first arm 78 may be a L-shaped arm. The first end 96 of the first arm 78 is rotatably coupled to the carrier 92 and the second end 100 of the first arm 78 is rotatably coupled to the mount plate 84. In some embodiments, the first arm 78 is secured to the carrier 92 by a pin 104, and is secured to the mounting plate 84 by a peg 108. As shown in FIG. 11, the first arm 78 includes a plurality of first arm teeth 110. The plurality of first arm teeth 110 extend from the first end 96 of the first arm 78. The plurality of first arm teeth 110 engage an index key 144 in the carrier 92 as described in more detail below.

Figure 4:
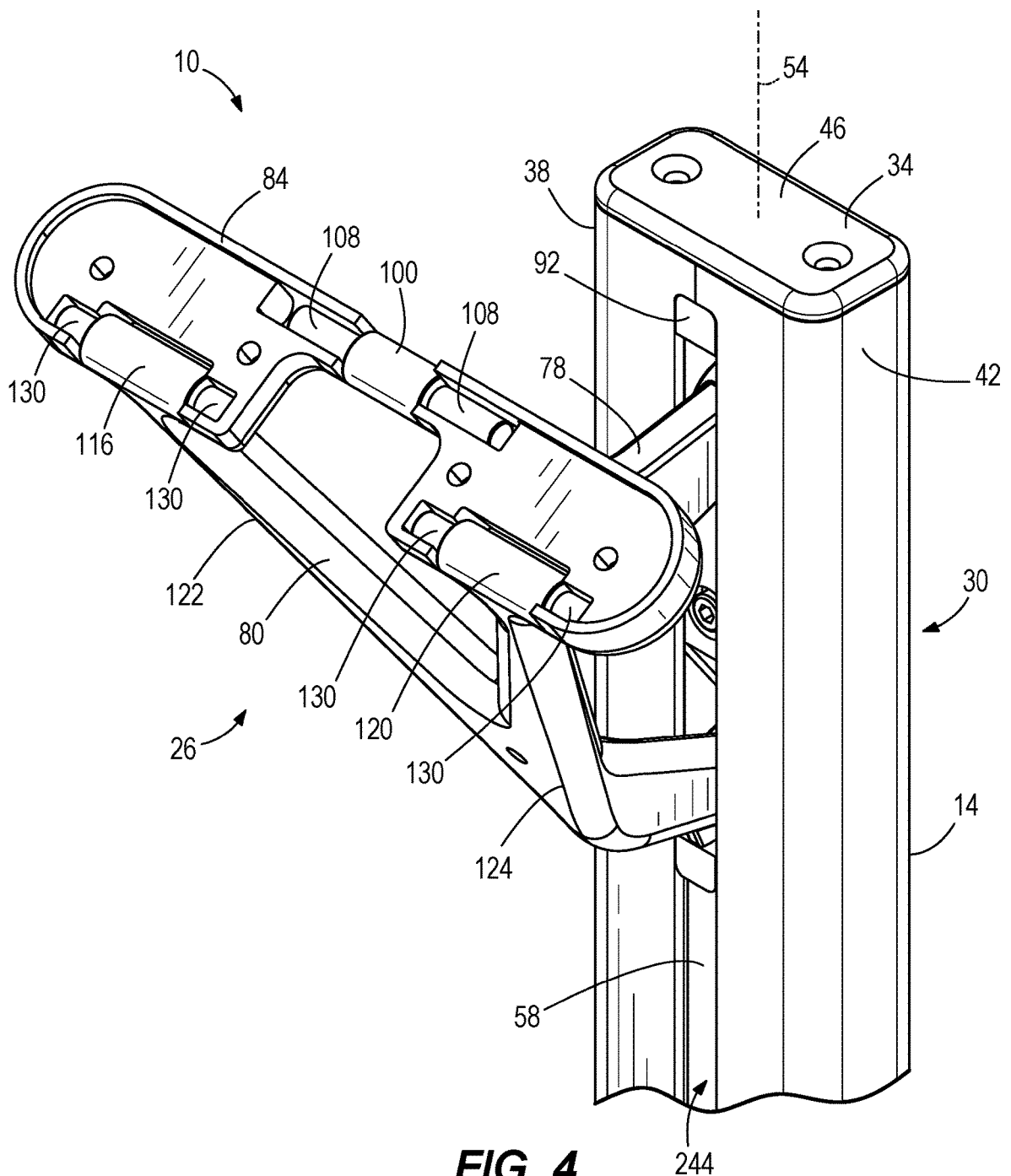
FIG. 4 is a top perspective view of the adjustable support of FIG. 3 with portions removed.

The illustrated embodiment of the second arm 80 may include a Y-shaped arm having a first limb 122 and a second limb 124. The first limb 122 extends between a first end 112 and a second end 116 opposite the first end 112. The second limb 124 extends between the first end 112 and a third end 120 opposite the first end 112. The Y-shape of the second arm 80 allows for the first arm 78 to nest between the limbs 122, 124 when the linkage assembly 26 is in a fully collapsed position, as shown in FIG. 12A. This allows the linkage assembly 26 to be stored in a more compact way (or slim profile) when the adjustable support 10 is not in use. However, it should be understood that the second arm 80 may be formed as other shapes. For example, the second arm 80 may include greater or fewer limbs (e.g., one or three). The first end 112 of the second arm 80 is rotatably coupled to the carrier 92. A pin 126 may be used to secure the second arm 80 to the carrier 92. The second end 116 and the third end 120 are coupled to the mount plate 84. The one or more second pegs 130 may be used to secure the second end 116 and the third end 120 of the second arm 80 to the mount plate 84. The one or more second pegs 130 are used to secure the second arm 80 to the mount plate 84. As shown in FIGS. 4 and 11, the second arm 80 includes a plurality of second arm teeth 132. The plurality of second arm teeth 132 extend from the first end 112 (FIG. 11). The plurality of second arm teeth 132 engage an index key 144 in the carrier 92 as described in more detail below.

With reference to FIGS. 3 and 4, the mount plate 84 may optionally include the mount plate cover 88. The mount plate 84 is coupled to first arm 78 and the second arm 80 and is attached to the platform 18. The mount plate 84 supports the platform 18, in which the electronic device is supported on. As shown in FIG. 4, the one or more first pegs 108 and the one or more second pegs 130 are used to secure the mount plate 84 to the first arm 78 and the second arm 80. A plurality of fasteners are used to secure the platform 18 to the mount plate 84 (not shown). In the illustrated embodiment, the mount plate 84 is formed as two pieces attached to the first arm 78 and the second arm 80. In other embodiments, the mount plate 84 may be formed as one piece that is secured to the first arm 78 and the second arm 80.

Figures 9, 10:
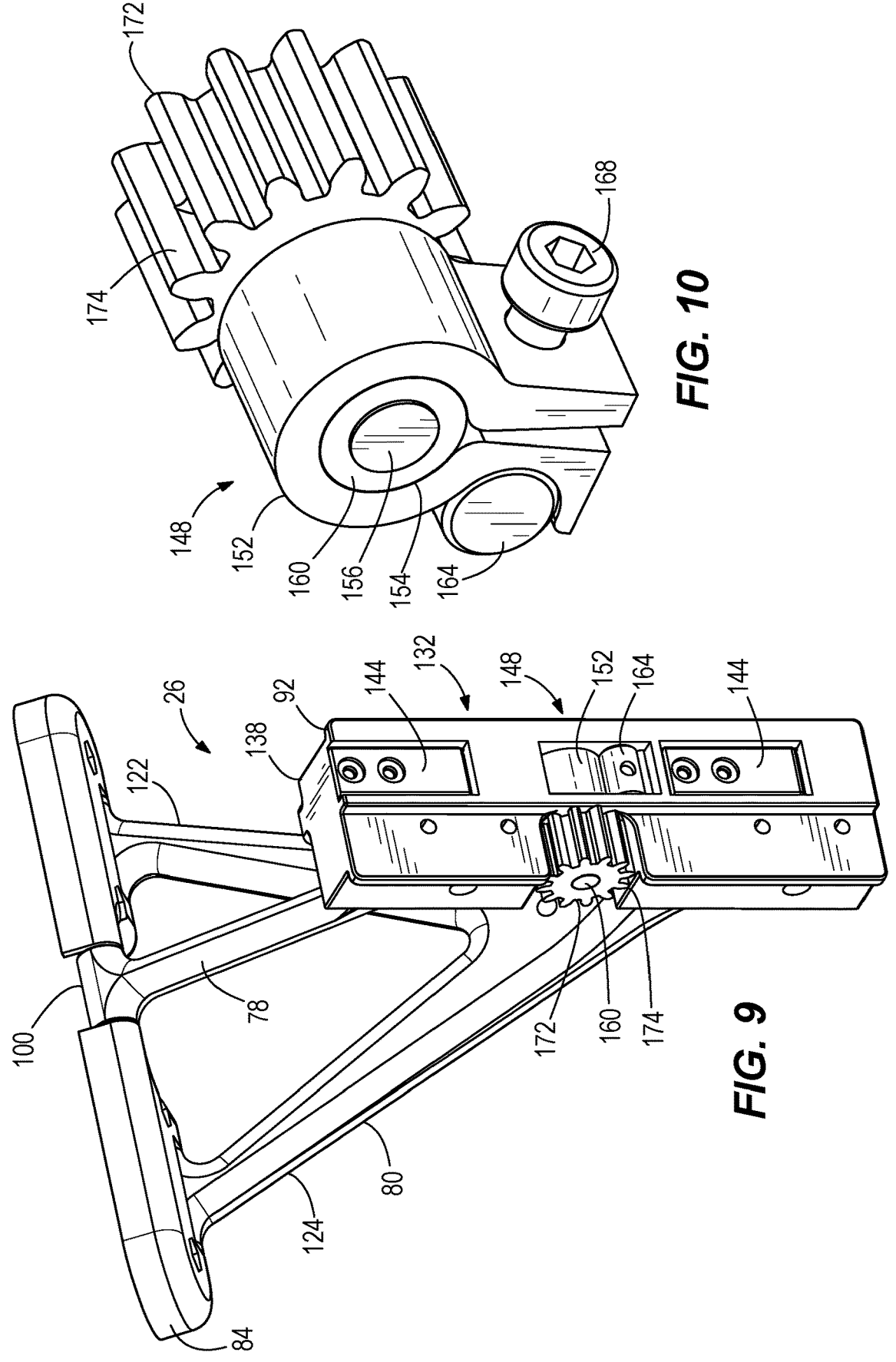
FIG. 9 is a rear perspective view of the linkage assembly of FIG. 8.
FIG. 10 is a perspective view of a friction grip for use with the linkage assembly of FIG. 8.

With reference to FIGS. 8 and 11, the carrier 92 acts as the one of the linkages in the linkage assembly 26 for adjusting the tilt angle of the platform 18. The carrier 92 also interacts with the post 14 for adjusting the height of the platform 18. As previously mentioned, the carrier 92 acts as the "fixed linkage" in the four bar linkage assembly in that it does not pivot or rotate. The carrier 92 may also be referred to as a housing because it supports the other members of the linkage assembly 26 and may be used to house other components. In the illustrated embodiment, the carrier 92 includes rails 136, friction blocks 140, and index keys 144 (FIGS. 8 and 9). However, other embodiments of a carrier 92 may differ such that various combinations of these features may be excluded in certain embodiments.

As shown in FIG. 8, the carrier 92 includes one or more friction blocks 140, which help control the tilt motion of the platform 18. In the illustrated embodiment, two friction blocks 140 are coupled to the housing, however, in other embodiments greater or fewer friction blocks 140 may be used. The friction blocks 140 engage the first and second arms 78, 80 respectively and provide a frictional force to control the rotation of the first and second arms 78, 80 respectively relative to the post 14. The friction blocks 140 frictionally engage the first arm 78 and the second arm 80 to provide a smooth rotation of the first and second arms 78, 80 respectively relative to the post 14. Together, the friction blocks 140 and the center of gravity balance (i.e., shown in FIGS. 13A-13D) help maintain the tilt position of the platform 18 without the need for a robust locking mechanism. Specifically, as shown in FIGS. 13A-13D, the linkage assembly 26 is configured to maintain a center of gravity 184 generally along a linear horizontal path referred to as the center of gravity line 188. The center of gravity balancing effect allows for the tilt of the platform 18 to be maintained primarily by balancing the forces between the linkage assembly 26. In other words, when a user adjusts the tilt of the platform 18, the platform 18 will remain at the desired tilt angle due to the equilibrium of the forces on the linkage assembly and the consistent center of gravity 184. The friction blocks 140 assist in maintaining this equilibrium of forces by creating a frictional force that reduces the ease with which the first arm 78 and second arm 80 may rotate. In other words, the linkage assembly is configured to maintain the tilt angle of the platform based on an equilibrium of forces and without the use of a locking mechanism.

As shown in FIG. 11, the carrier 92 may optionally include index keys 144. The index keys 144 are coupled to the carrier 92. In the illustrated embodiment, two index keys 144 are coupled to the carrier 92. The index keys 144 engage the plurality of first arm teeth 110 and the plurality of second arm teeth 132 (FIG. 11). The index keys 144 include a lip 146 that engage the plurality of first arm teeth 110 and the plurality of second arm teeth 132. The index keys 144 provide a tactile feedback sound to a user of the rotation of the first and second arms 78, 80 respectively relative to the post 14. It should be understood that in some embodiments there may only be one index key 144 and one set of teeth 110, 112 used to create the tactile feedback. Alternatively, in some embodiments, this feature may be omitted entirely. Furthermore, in some embodiments, the index keys 144 and teeth 110, 112 may provide function beyond the tactile feedback, and may be used as a racket pawl mechanism to limit rotation (i.e., lock rotation) of the first arm 78 and second arm 80. In some embodiments, the linkage assembly 26 may not include teeth 110, 112 and index keys 144, as these are optional features.

As mentioned, the carrier 92 also interacts with the post 14 for adjusting the height of the platform 18. The carrier 92 is movably positioned within the post cavity 44. The carrier 92 may include one or more rails 136, one or more friction blocks 140, and/or one or more index keys 144 (e.g., one, two, three, or four). The illustrated carrier 92 includes an outer surface 138 which includes the rails 136. The rails 136 extend along the outer surface 138 of the carrier 92. In the illustrated embodiment, the carrier 92 includes two rails 136, however a greater or fewer number of rails may be used. The rails 136 engage the tracks 74 of the post 14 to guide movement of the carrier 92 within the post 14 along the longitudinal axis 54 between the first end 46 and the second end 50. linkage assembly FIGS. 10 and 11 illustrate a friction grip 148 positioned in the carrier 92. The friction grip 148 helps control the vertical position of the linkage assembly 26 relative to the post 14, and thus, controls the height of the platform 18. Specifically, the friction grip 148 provides a frictional force to either allow for movement (e.g., in the upward direction) or restrict movement (e.g., in the downward direction) of the carrier 92 along the longitudinal axis 54. The friction grip 148 utilizes friction to maintain the carrier 92 at a desired height within the post 14, and to selectively allow for movement of the carrier 92 within the post 14. To move the carrier 92 in a downward direction a force is applied to overcome the frictional force of friction grip 148, and thus allowing movement of the linkage assembly 26 to a lower height. For example, a downward force may be applied to the platform 18 to overcome the frictional force of the friction grip 148, and thereby allow a user to lower the height of the platform 18.

In the illustrated embodiment, the friction grip 148 is more freely moveable in the upward direction than the downward direction. For example, the friction grip 148 may be freely movable in an upward direction while requiring a greater applied force to move the carrier 92 in a downward direction. Accordingly, in this example, it would be easier to move the platform 18 in an upward direction than it would be to move the platform 18 in a downward direction. However, in other embodiments, the frictional force applied by the friction grip 148 may be equal in both the upward and downward direction. It should be understood that there are multiple different ways to create a friction grip 148 capable of applying a frictional force to maintain the linkage assembly 26 and the platform 18 at a desired height while allowing selective movement thereof by applying a force to overcome the frictional force of the friction grip 148. One exemplary embodiment is described below.

The exemplary friction grip 148 illustrated in FIG. 10 includes a bearing 160, such as a one way bearing, to control movement of the carrier 92 within the post 14. Although different configurations are possible, the illustrated friction grip 148 includes an eyelet 152, a pin 156, the bearing 160, a nut 164, and a screw 168. The eyelet 152 defines an eyelet aperture 154. The eyelet aperture 154 receives the pin 156 and the bearing 160. The bearing 160 may be a one way bearing such that the bearing 160 freely rotates in one rotational direction and is restricted (or partially restricted) from rotating in the opposite direction. The nut 164 abuts the eyelet 152. The screw 168 threadably engages the eyelet 152 and the nut 164. The screw 168 is rotatable to adjust the amount of frictional force around the pin 156 and the bearing 160.

Referring to FIGS. 8 and 9, the friction grip further includes a pinion 172. The pinion 172 helps provide for smooth and consistent movement of the linkage assembly 26 along the post 14. In particular, the pinion 172 is coupled to the pin 156 of the friction grip 148. The pinion 172 may be referred to as a gear or a helical gear. The pinion 172 defines a pinion aperture and includes a plurality of teeth 174. The pinion aperture of the pinion 172 receives the pin 156. The pinion 172 rotatably engages the rack 70 of the post 14. The plurality of teeth 174 engage the corresponding teeth of the rack 70 positioned in the post 14.

In operation, the friction grip 148 controls the rotation of the pinion 172 in one rotational direction. The bearing 160 allows the pinion 172 to freely rotate in a first rotational direction which allows the linkage assembly 26 to move relative to the post 14 (e.g., upward in a direction towards the first end 46 of the post 14). The bearing 160 restricts the pinion 172 from freely rotating in a second rotational direction opposite the first rotational direction which causes the linkage assembly 26 to remain stationary (e.g., restricts or partially restricts movement in a downward direction towards the second end 50 of the post 14). In other words, the friction grip 148 controls a resistance from a downward force (e.g., force applied approximately parallel to the axis 54 toward the second end 50 of the post 14) applied to the linkage assembly 26. The friction grip 148 is set to a weight rating typical of a weight of an electronic device (e.g., 3 to 7 pounds). When a user places an electronic device on the platform 18, the friction grip 148 prevents the linkage assembly 26 from moving toward the base 12. When a user wants to adjust an elevation of the electronic device relative to a desktop, the user applies a downward force that overcomes the set weight rating of the friction grip 148 to move the platform 18 closer to the base 12. In some embodiments, the movement of the pinion 172 along the rack 70 allows the linkage assembly 26 to be engaged with the post 14 in a first position relative to the longitudinal axis 54 of the post 14 and a second position relative to the longitudinal axis 54 of the post 14. The second position is different than the first position.

With reference to FIGS. 12A-12C, the linkage assembly 26 and platform 18 are movable to different heights along the post 14. Specifically, the linkage assembly 26 is movable in an axial direction relative to the longitudinal axis 54 of the post 14 (FIG. 2). Movement of the linkage assembly 26 allows the platform 18 to be shifted to different heights along the post 14. When a user wants to adjust a vertical position of the platform 18, the user grabs the edges of the platform 18 and applies an upward or downward force to the platform 18. When the upward or downward force is applied, the platform 18 is movable relative to the post 14. In illustrated embodiment, the platform 18 of the adjustable support 10 is adjustable in a plurality of vertical positions along the post 14 relative to the base 12.

Figures 13A, 13B, 13C, 13D:
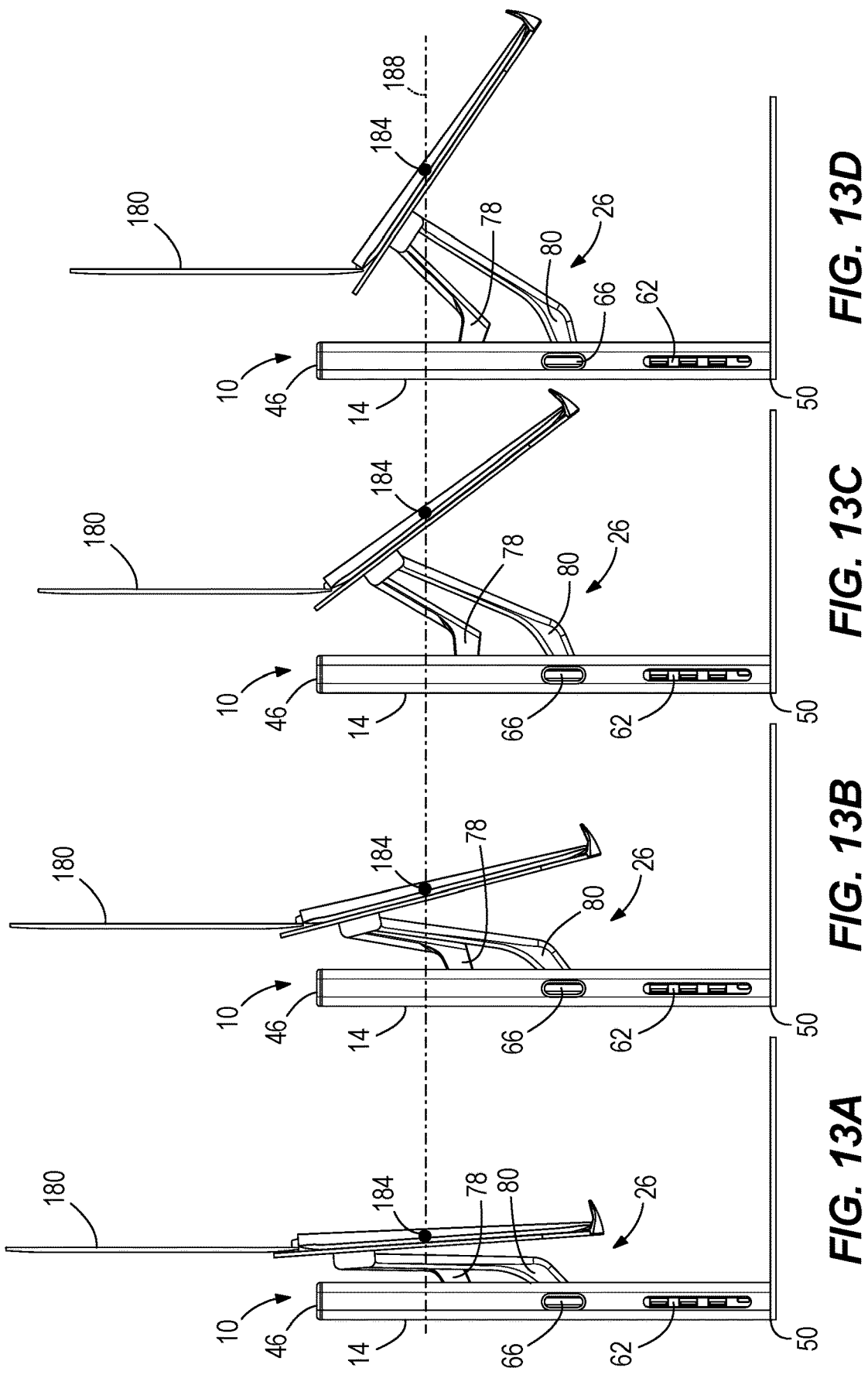
FIGS. 13A-13D is a side view of the adjustable support of FIG. 1 moving from a first position to a fourth position along a center of gravity line.

With reference to FIGS. 13A-13D, the linkage assembly 26 and platform 18 are also adjustable to different tilt angles and/or horizontal positions relative to the post 14. FIGS. 13A-13D illustrate the platform 18 in a plurality of different tilt angles. FIG. 13A illustrates the adjustable support 10 in a fully collapsed position. In this position, the platform 18 is positioned close to the post 14 and is oriented generally in alignment with the longitudinal axis 54. FIGS. 13B-13D illustrates the adjustable support 10 in various extended position in which the platform 18 is pulled away from the post 14 and tilted relative to the longitudinal axis 54. When the user wants to adjust a horizontal position of the platform 18 and/or the tilt angle of the platform 18, the user grabs the edges of the platform 18 to pull or push the platform horizontally relative to the post 14 (e.g., right and left in FIG. 12). When the push or pull force is applied, the first arm 78 and the second arm 80 of the linkage assembly rotate relative to carrier 92 to move the platform 18 forward or rearward relative to the post 14. The platform 18 is adjustable from a first position, in which the platform is angled obliquely relative to the post 14 at a first angle, to a second position, in which the platform is angled obliquely relative to the post 14 at a second angle, which is greater than the first angle. In the illustrated embodiment, the platform 18 is adjustable to a plurality of different positions, which adjust the tilt angle to various oblique angles relative to the post 14.

FIGS. 13A-13D also illustrates the adjustable support 10 supporting an exemplary electronic device 180 in a plurality of tilt positions (a)-(d), in which the center of gravity 184 remains generally along a linear horizontal path. When a user adjusts the tilt angle of the platform 18 from a first position (a) to a fourth position (d), the user pulls the platform 18 in a first horizontal direction (e.g., right in FIG. 13). The linkage assembly 26, and in particular, the first and second arms 78, 80 respectively, maintain the center of gravity 184 generally along a center of gravity line 188 in positions (a)-(d). In other words, the center of gravity 184 of the electronic device 180 does not deviate greatly from the center of gravity line 188 in the different tilt positions (a)-(d). In some embodiments, the center of gravity 184 may deviate approximately plus or minus 5 mm from the center of gravity line 188 in the different tilt positions (a)-(d). Rather, the linkage assembly 26 stabilizes the electronic device 180 during tilt adjustments of the platform 18.

The axial movement and rotational movement of the adjustable support 10 allows for a full ergonomic solution and allows a user to set the electronic device to a desired vertical height, horizontal position, and tilt angle for improved productivity. The adjustable support 10 also allows for the use of a separate computer peripherals (e.g., mouse and keyboard).

Figure 14:
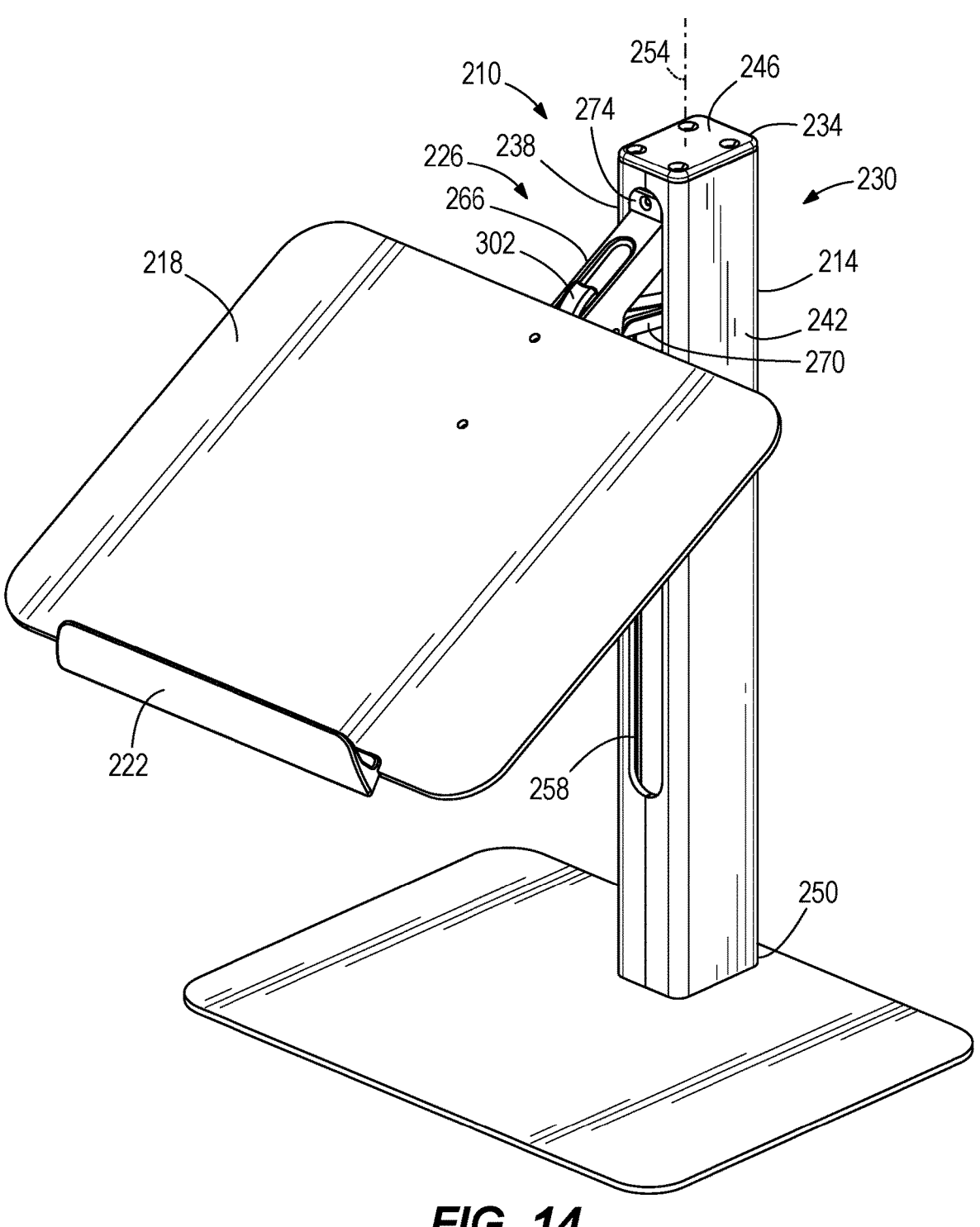
FIG. 14 is a top perspective view of another embodiment of an adjustable support.

FIG. 14 illustrates another embodiment of an adjustable support 210 configured to support an electronic device such as a computer, a laptop, a tablet, a mobile phone, or other devices. The adjustable support 210 is coupled to a base 12. The base 12 may include a horizontal base 12 such as desktops, or tabletops (FIG. 14). In other embodiments, the base 12 may include a vertical base 12 such as a wall or post. The base 12 illustrated in FIG. 14 may be similar to the base 12 described above in FIG. 1.

Figure 15:
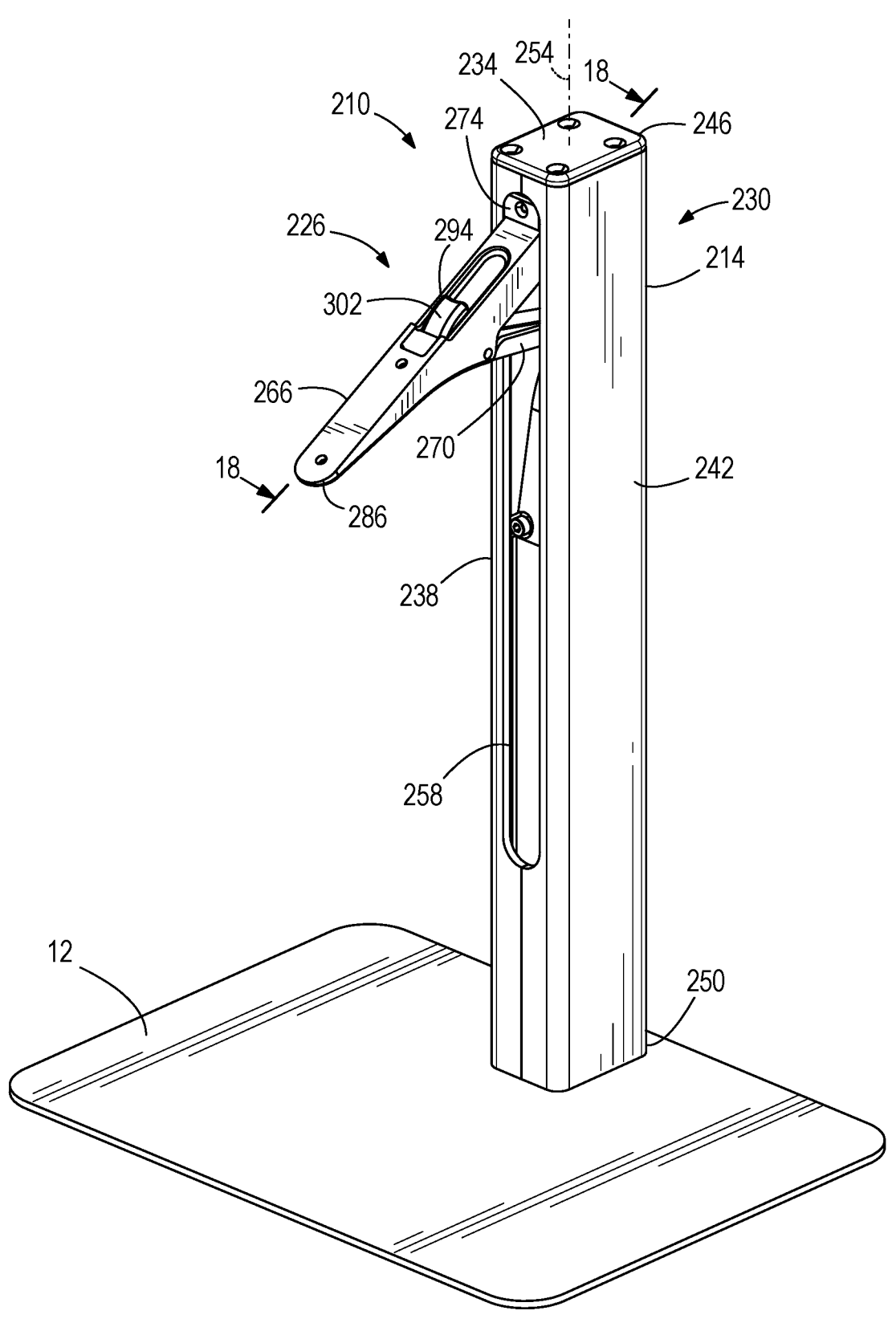
FIG. 15 is a top perspective view of the adjustable support of FIG. 14 with portions removed.

With reference to FIGS. 14 and 15, the adjustable support 210 includes a post 214 connected to the base 12, a platform 218 including a platform ledge 222, and an linkage assembly 226 movably engaged with the post 214. The post 214 includes a post housing 30 having a post top plate 234, a post first housing portion 238, and a post second housing portion 242. The post top plate 234, the post first housing portion 238, and the post second housing portion 242 together define a post cavity 244. The post 214 includes a first end 246 and a second end 250 opposite the first end 246. A longitudinal axis 254 extends centrally through the post 214 between the first end 246 and the second end 250. The post 214 includes a length defined along the longitudinal axis 254 between the first end 246 and the second end 250.

With continued reference to FIGS. 14 and 15, the post 214 defines a post slot 258. In other words, the post first housing portion 238 and the post second housing portion 242 define the post slot 258. As described in more detail below, the linkage assembly 226 extends through the post slot 258 to a distal point away from the post 214. The post 214 may include a Universal Serial Bus (USB) port or power hub to provide connectivity or power to an electronic device as described above for the adjustable support 10. The post 214 also includes a rack 262 positioned in the post 214, and in particular, in the post cavity 244 (FIG. 16).

Figure 16:
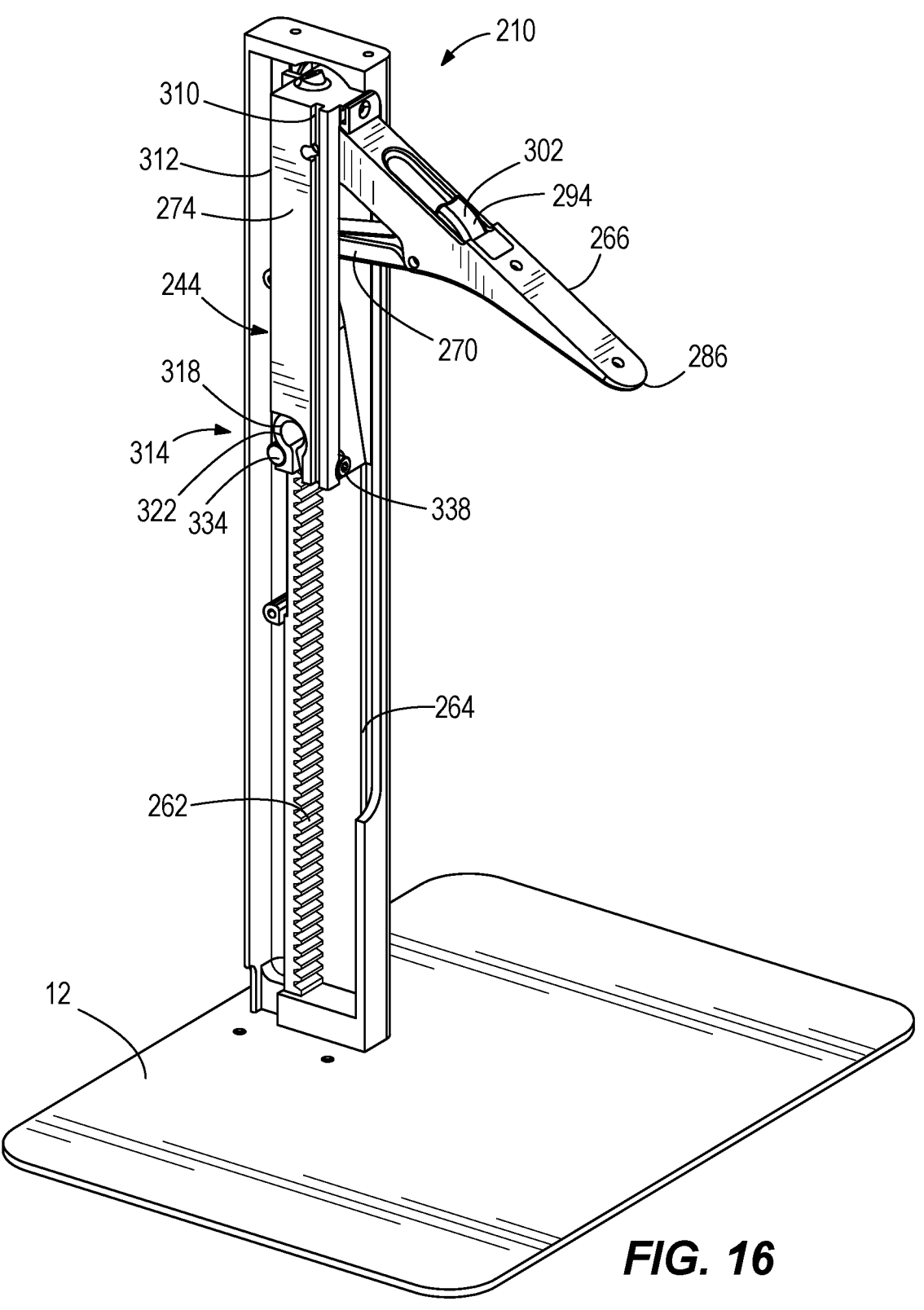
FIG. 16 is a side view of the adjustable support of FIG. 15 with portions removed.
Figure 17:
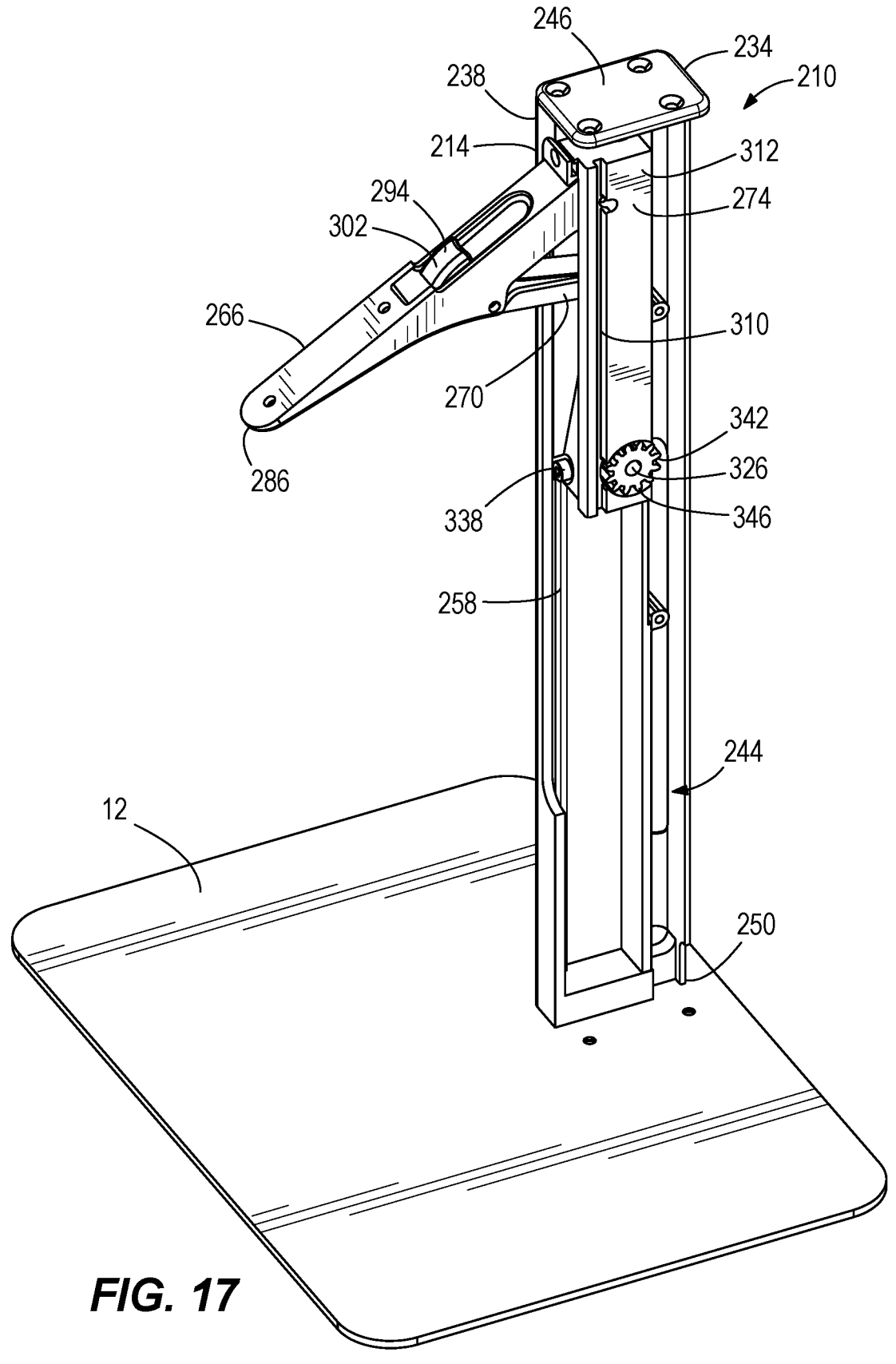
FIG. 17 is a side view of the adjustable support of FIG. 15 with portions removed.

As shown in FIGS. 16 and 17, the post 214 includes rails 264. In the illustrated embodiment, the post 214 includes two rails 264. In other embodiments, the post 214 may include one or more rails 264 (e.g., one, two, three, or four). The rails 264 may be positioned in the post 214, and in particular, the post cavity 244. The rails 264 extend from near the first end 246 toward the second end 250 of the post 214. In the illustrated embodiment, the rails 264 may extend along a majority of the length of the post 214. As described in more detail below, the linkage assembly 226 includes channels 310 that engage the rails 264 to guide the linkage assembly 226 in the post 214 relative to the longitudinal axis 254 between the first end 246 and the second end 250.

With reference to FIG. 14, the platform 218 is movably coupled to the linkage assembly 226. The platform 218 may be similar to the platform 18 described above. The platform 218 is configured to support the electronic device. The platform 218 includes a square, rectangular, or other suitable shape to support an electronic device. The platform 218 may include ridges or a grip surface to keep an electronic device on the platform 218. The platform 218 also includes the platform ledge 222 extending from the platform 218. The platform ledge 222 may also be referred to as a lip. The platform ledge 222 is configured to prevent an electronic device from sliding off the platform. In the illustrated embodiment, the platform ledge 222 may extend approximately ninety degrees relative to the platform 218. In other embodiments, the platform ledge 222 may extend obliquely relative to the platform 218.

Figure 18:
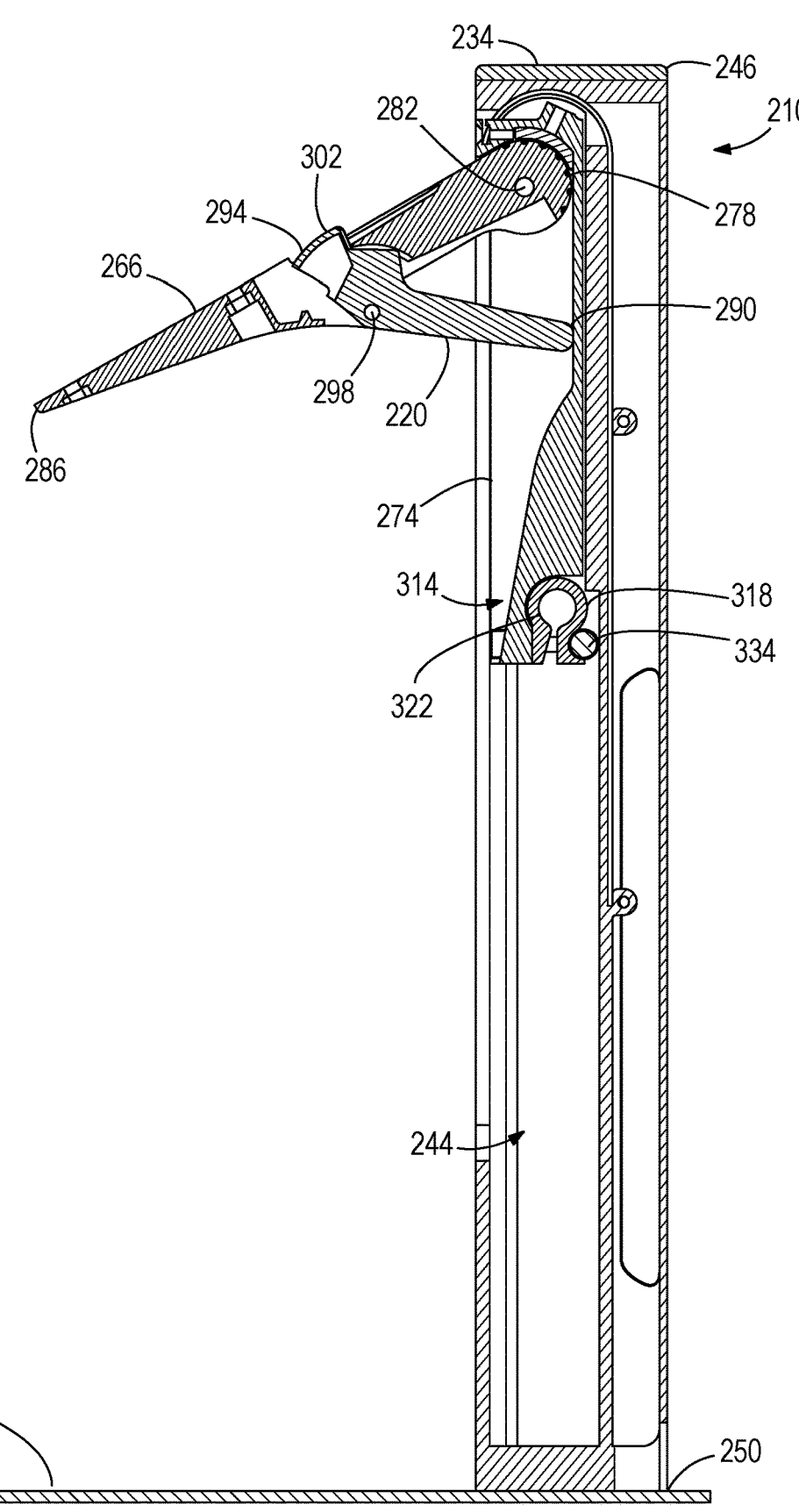
FIG. 18 is a cross sectional view of the adjustable support of FIG. 15 through line 18-18 of FIG. 15.

FIGS. 15 and 16 illustrate the linkage assembly 226 movably engaged with the post 214. The linkage assembly 226 includes a first arm 266, a second arm 270, and a carrier 274. The first arm 266 includes a first end 278 and a second end 286 opposite the first end 278 (FIG. 18). The first end 278 of the first arm 266 is rotatably coupled to the carrier 274. A pin 282 is used to secure the first arm 266 to the carrier 274.

With reference to FIGS. 17 and 18, the second arm 270 is rotatably coupled to the first arm 266. The second arm 270 includes a first end 290 and a second end 294 opposite the first end 290 (FIG. 18). The first end 290 of the second arm 270 is rotatably coupled to the carrier 274. A pin 298 is used to secure the second arm 270 to the carrier 274. The second arm 270 includes an actuator 302 (FIGS. 17 and 18). The actuator 302 may also be referred to as a button or lever. The actuator 302 extends from the second end 294 of the second arm 270. The movement of the actuator 302 allows the second arm 270 to rotate relative to first arm 266 to adjust an angular position of the first arm 266, in which the platform 218 is attached to, relative to the post 214.

As shown in FIGS. 15 and 16, the carrier 274 is movably positioned in the post 214. In other words, the carrier 274 is movably positioned in the post cavity 244. The carrier 274 may also be referred to as a housing. The carrier 274 includes channels 310 (FIGS. 16 and 17). In the illustrated embodiment, the carrier 274 includes two channels 310. In other embodiments, the carrier 274 may include one or more channels 310 (e.g., one, two, three, or four). The carrier 274 includes an outer surface 312 that defines the channels 310. The channels 310 extend along the outer surface 312 of the carrier 274. The channels 310 of the carrier 274 receive the rails 264 of the post 214 to guide the carrier 274 in the post 214 along the longitudinal axis 254 between the first end 246 and the second end 250. In other words, the rails 264 of the post 214 engage the channels 310 of the carrier 274 to guide the linkage assembly 226 in the post 214 along the longitudinal axis 254 between the first end 246 and the second end 250.

FIGS. 16 and 17 illustrate a friction grip 314 positioned in the carrier 274. The friction grip 314 may be similar to the friction grip 148 described above. The friction grip 314 includes an eyelet 318, a pin 326, a bearing 330, a nut 334, and a screw 338. The eyelet 318 defines an eyelet aperture 322. The eyelet aperture 322 receives the pin 326 and the bearing 330. The bearing 330 may include a one way bearing such that the bearing 330 freely rotates in one rotational direction. The nut 334 abuts the eyelet 318. The screw 338 threadably engages the eyelet 318 and the nut 334. The screw 338 is rotatable to adjust a frictional force around the pin 326 and the bearing 330.

FIG. 17 illustrate a pinion 342 coupled to the friction grip 314. In particular, the pinion 342 is coupled to the pin 326 of the friction grip 314. The pinion 342 may be referred to as a gear. The pinion 342 defines a pinion aperture and includes a plurality of teeth 346. The pinion aperture of the pinion 342 receives the pin 326. The pinion 342 rotatably engages the rack 262 of the post 214. The plurality of teeth 346 engage the rack 262 of the post 214.

In operation, the friction grip 314 controls the rotation of the pinion 342 in one rotational direction. The friction grip 314 may operate similarly to the friction grip 148 described above. The pinion 342 freely rotates in a first rotational direction which allows the linkage assembly 226 to move relative to the post 214 (e.g., direction towards the first end 46 of the post 14). The pinion 342 does not freely rotate in a second rotational direction opposite the first rotational direction which causes the linkage assembly 226 to remain stationary (e.g., direction towards the second end 250 of the post 214). The friction grip 314 controls the second rotational direction of the pinion 342. In other words, the friction grip 314 controls a resistance from a downward force (e.g., force applied approximately parallel to the axis 54 toward the second end 250 of the post 214) applied to the linkage assembly 226. The friction grip 314 is set to a weight rating typical of a weight of an electronic device (e.g., 3 to 7 pounds). When a user places an electronic device on the platform 218, the friction grip 314 engages the pinion preventing the linkage assembly 226 from moving toward the base 12. When a user wants to adjust an elevation of the electronic device relative to a desktop, the user applies a downward force that overcomes the set weight rating of the friction grip 314 to move the platform 218 closer to the base 12.

The adjustable support 210 is movable in an axial direction along the longitudinal axis 54 of the post 214 (FIG. 14). The linkage assembly 226 allows the platform 218 to move axially along the post 214. When a user wants to adjust a vertical position of the platform 218, the user grabs the edges of the platform 218 and applies an upward or downward force to the platform 218. When the upward or downward force is applied, the platform 218 is movable relative to the post 214. In illustrated embodiment, the platform 218 of the adjustable support 210 is adjustable in a plurality of vertical positions along the post 214 relative to the base 12. When the user wants to adjust a rotational position of the platform 218, the user presses the actuator 302 on the second arm 270 to rotate the platform 218 relative to the post 214. When the actuator 302 is pressed, the second arm 270 disengages from the carrier 274 to allow the first arm 266, in which the platform 218 is attached to, to rotate relative to post 14. When the desired position is set, the second arm 270 engages the carrier 274 to allow the first arm 266, in which the platform 218 is attached to, to remain stationary relative to the post 214. In the illustrated embodiment, the platform 18 is adjustable in a plurality of angled positions relative to the post 14.

Figure 19:
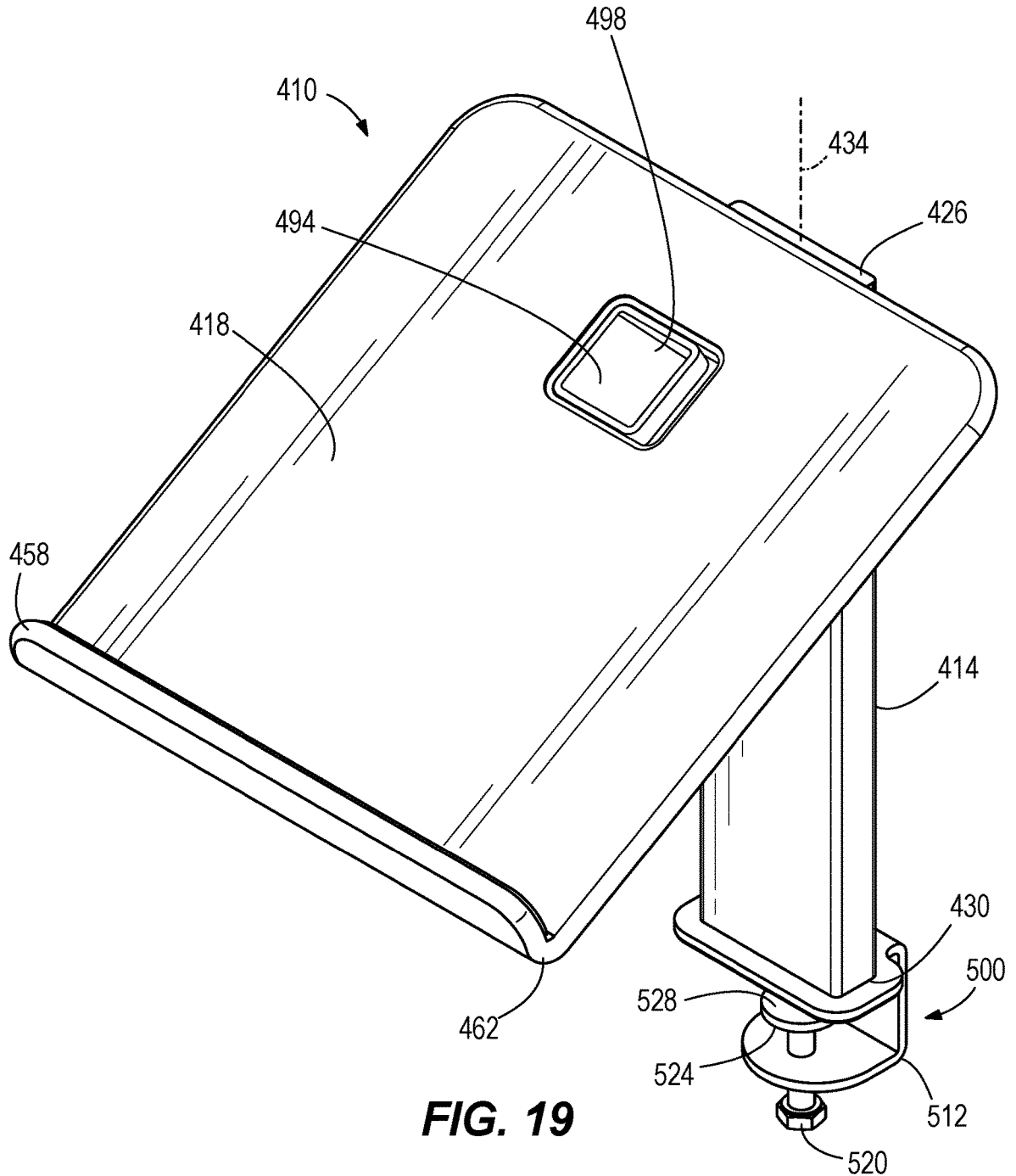
FIG. 19 is a top perspective view of another embodiment an adjustable support.
Figure 20:
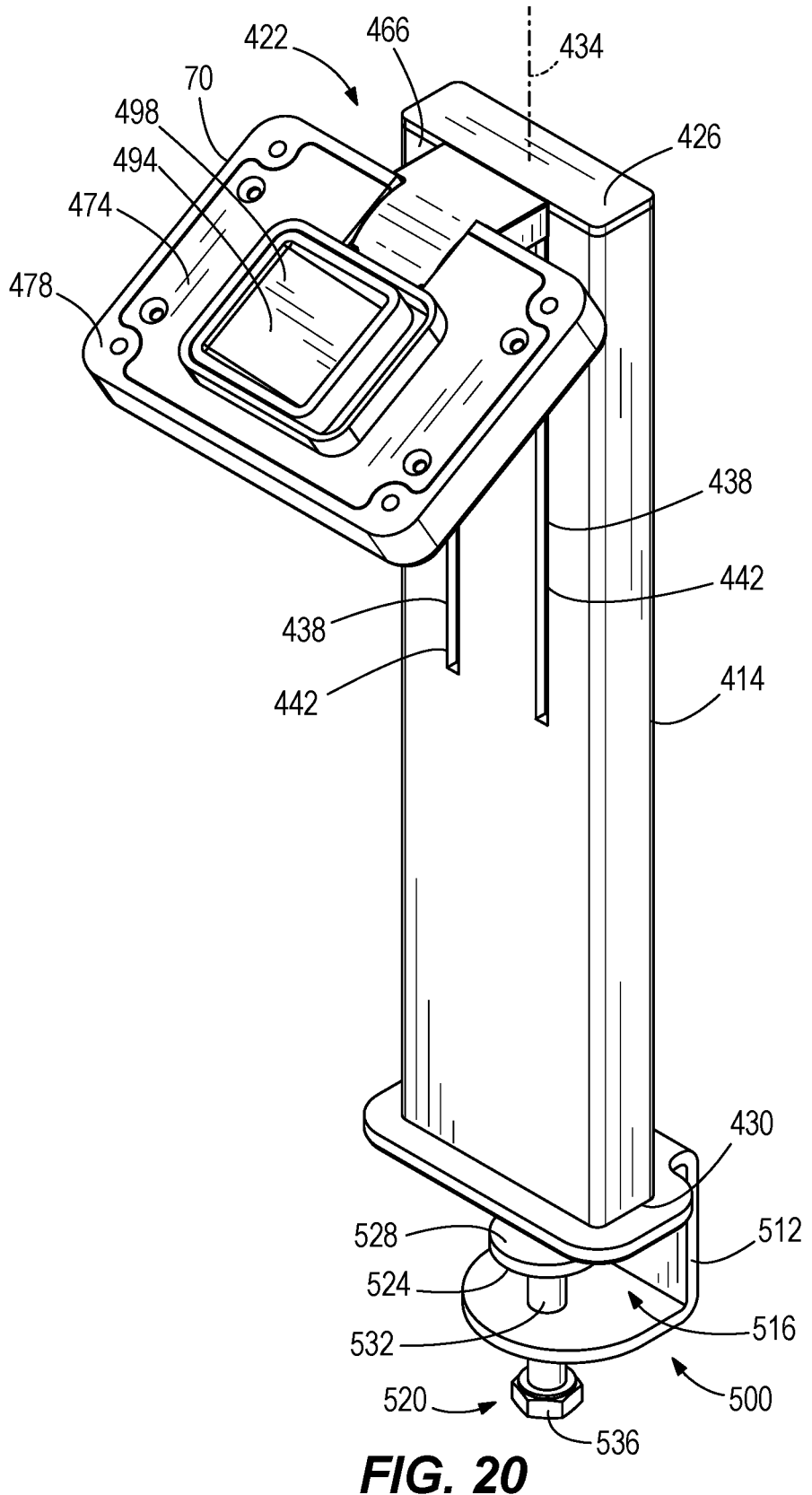
FIG. 20 is a top perspective view of the adjustable support of FIG. 19 with a platform removed.

FIGS. 19 and 20 illustrate another embodiment of an adjustable support 410. The adjustable support may be used with the base 12 described above. The adjustable support 410 includes a post 414 connected to the base 12, a platform 418, and a hinge assembly 422 for movably coupling the platform 418 to the post 414. The post 414 includes a first end 426 and a second end 430 opposite the first end 426. An axis 434 extends centrally through the post 414 between the first end 426 and the second end 430. The axis 434 may also be referred to as a longitudinal axis. The post 414 includes a length defined along the axis 434 between the first end 426 and the second end 430.

As shown in FIG. 20, the post 414 further includes tracks 438 that extend from near the first end 426 toward the second end 430. In the illustrated embodiment, the tracks 438 extend along a portion of the length of the post 414. In other embodiments, the tracks 438 extend the entire length of the post 414. In the illustrated embodiment, the post 414 includes two tracks 438. In other embodiments, the post 414 may include one or more tracks 428 (e.g., one, two, three, four, or five tracks). The tracks 438 include edges 442 that engage the hinge assembly 422. The hinge assembly 422 engages the edges 442 of the tracks 438 to guide the hinge assembly 422, in which the platform 418 is attached to, relative to the axis 434 between the first end 426 and the second end 430.

With continued reference to FIG. 19, the platform 418 is movably coupled to the post 414. The platform 418 is configured to support an electronic device. The platform 418 includes a square or rectangular shape. The platform 18 defines a platform recess 454. As shown in FIG. 19, the platform 418 includes a ledge 458 extending from an end 462 of the platform 418. The ledge 458 may also be referred to as a lip. The ledge 458 is configured to prevent an electronic device from sliding off the platform 418. The ledge 458 may extend approximately ninety degrees relative to the platform 418. In other embodiments, the ledge 458 may extend obliquely relative to the platform 418.

Figure 21:
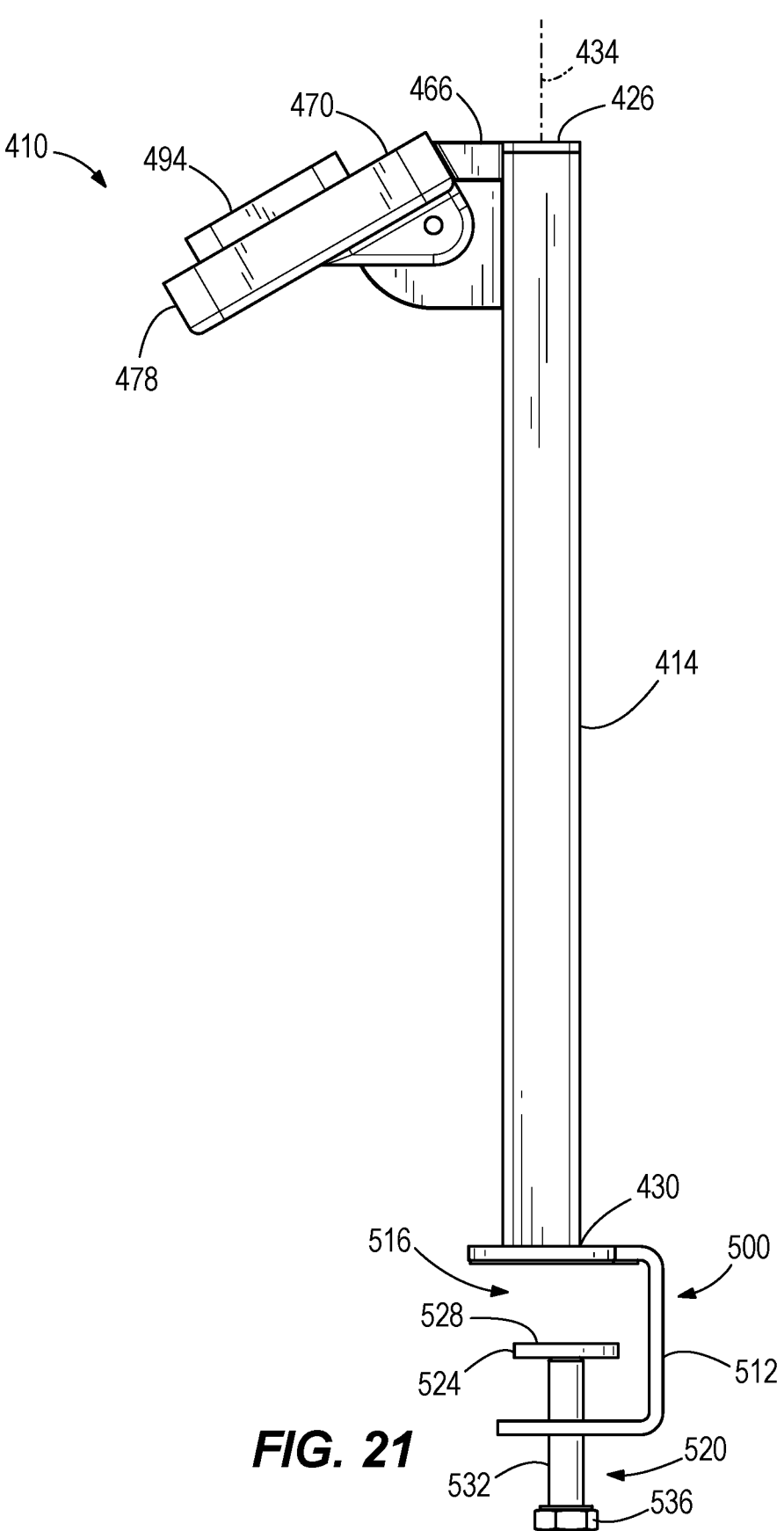
FIG. 21 is a side view of the adjustable support of FIG. 20.

FIGS. 20 and 21 illustrate the hinge assembly 422 for movably coupled to the post 414. The hinge assembly 422 includes a mount 466 and a hinge 470. The mount 466 movably couples the hinge 470, in which the platform 418 is attached to, to the post 414. The mount 466 extends into the tracks 438. The mount 466 may include a lip, a rail, or a protrusion that engages the tracks 438. The mount 466, in which the hinge 470 is coupled to, is movable relative to the axis 434 of the post 414. In other words, the hinge assembly 422, in which the platform 418 is attached, is movable relative to the axis 434 of the post 414.

With continued reference to FIGS. 20 and 21, the hinge 470 is rotatably coupled to the mount 466. A pin 490 is used to secure the hinge 470 to the mount 466. The hinge 470 includes a hinge plate 474 and a hinge housing 478. The hinge plate 474 is attached to the hinge housing 478 to define a hinge cavity 482. The hinge plate 474 defines a plate recess 486 for receiving an actuator 494 as described in more detail below.

FIGS. 20 and 21 illustrate the actuator 494 positioned in the hinge cavity 482. The actuator 494 may also be referred to as a button. The actuator 494 is configured to selectively move the hinge 470, in which the platform 418 is attached to, from a first, open position to a second, collapsed position. As shown in FIG. 20, the actuator 494 includes a generally rectangular shape with an angled surface 498. The actuator 494 extends through the plate recess 486 and the platform recess 454 such that the angled surface is visible when the platform 218 is attached to the hinge assembly 422. The angled surface 498 is configured to receive a user's thumb or finger. The actuator 494 is movable (i.e., downward force) to adjust a position of the platform 418 relative to the post 414. The platform 418 is adjustable between the first position and the second position. The platform 418 is obliquely angled relative to the post 414 in the first position. The platform 418 is approximately parallel relative to the post 414 in the second position. The platform 418 is collapsed relative to the post 414 in the second position.

In operation, the adjustable support 410 is configured to support an electronic device. The adjustable support is movable relative to the axis 434 of the post 414. The adjustable support 410 is movable in a rotational direction relative to the axis 434 of the post 414. The hinge assembly 422 allows the platform 418 to rotate relative to the post 414. Movement of the actuator 494 (e.g., downward press force) allows the hinge 470 and platform 418 to rotate together relative to the post 414. In particular, the adjustable support 410 is movable from the first position, in which the platform 418 is obliquely angled relative to the post 414, to a second position, in which the platform 418 is collapsed relative to the post 414. In other words, the platform 418 is approximately parallel with post 414 in the second position. The adjustable support 410 is configured to support the electronic device in the first position. The adjustable support 410 is configured for storage or reduce desktop space in the second position. The axial movement and rotational movement of the adjustable support 410 allows for a full ergonomic solution, and allows a user to set the electronic device to a desired position for improved productivity. The adjustable support 410 also allows for the use of a separate computer peripherals (e.g., mouse and keyboard) to further improve ergonomics and productivity.

Figure 22:
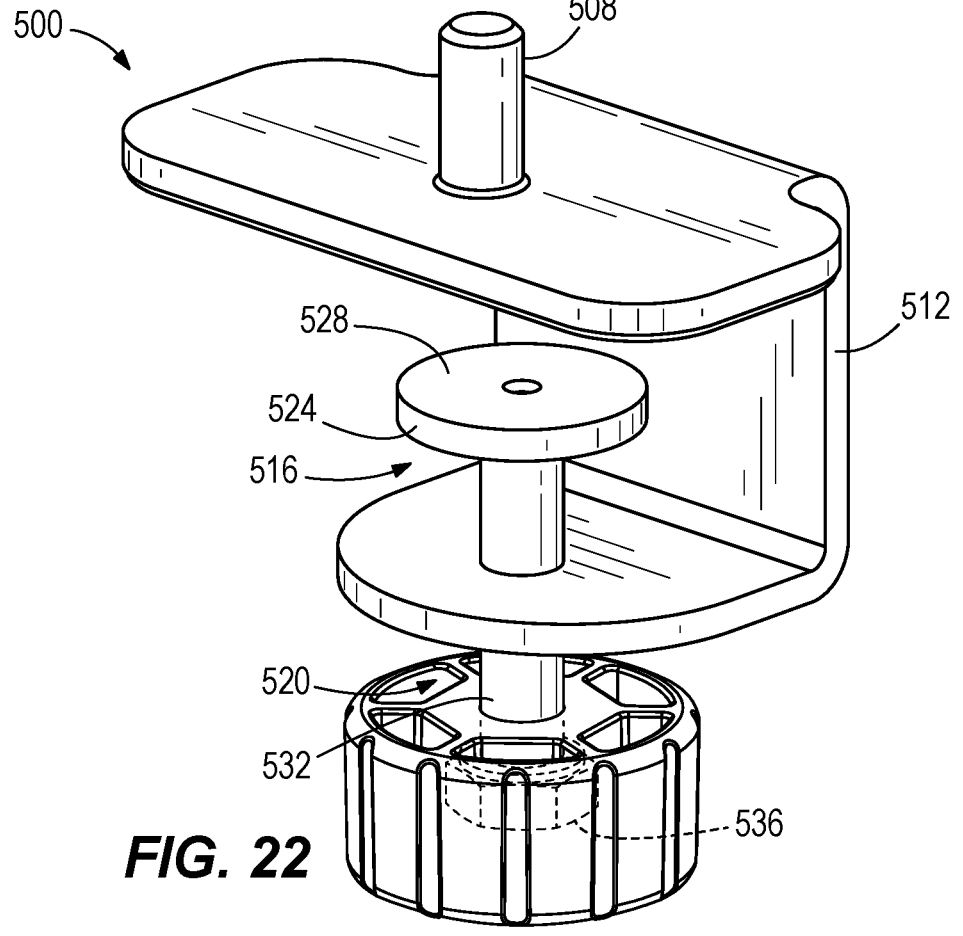
FIG. 22 is a perspective view of a clamp for connecting an adjustable support to a base.

FIG. 22 illustrates a clamp 500 for connecting an adjustable support to the base 12. The clamp 500 may be used with the adjustable support 10, 210, and 410 described above. The clamp 500 is connected to the second end 50, 250, and 430 of the post 14, 214, and 414 respectively. In one example, the clamp 500 is secured to an edge of a desk or table (e.g., horizontal base). In other examples, the clamp

500 extends through a desk or table. The clamp 500 includes a clamp pin 508 configured to be inserted into the post 14, 214, and 414. The clamp pin 508 is used to secure the clamp 500 to the post 14, 214, and 414.

As shown in FIG. 22, the clamp 500 includes a c-shaped bracket 512 that defines a channel 516 for receiving the base 12. In the illustrated embodiment, the c-shaped bracket 512 may be formed monolithically as a single structure. In some embodiments, the c-shaped bracket 512 may be formed as two or more separate structures. In other embodiments, the bracket 512 may include a L-shaped bracket formed monolithically as a single structure. Still, in other embodiments, the bracket 512 may include a L-shaped bracket formed as two or more separate structures. In one example, the channel 516 receives a table or desk. The clamp 500 includes a fastener 520 extending into the channel 516 that secures the adjustable support to the base 12. The fastener 520 includes a flange 524 having a flat surface 528 that engages the base 12, a shaft 532, and a head 536. The head 536 may be a twist knob that allows a user to tighten or loosen the clamp 500. In other embodiments, the head 536 may be a screw head capable of receiving a tool for tightening or loosening the clamp 500. When the adjustable support is positioned for use, a user can use the head to tighten the clamp 500 and secure the adjustable support to the base 12. In other embodiments, the adjustable support may include other means of coupling the base 12.

Figures 23, 24:
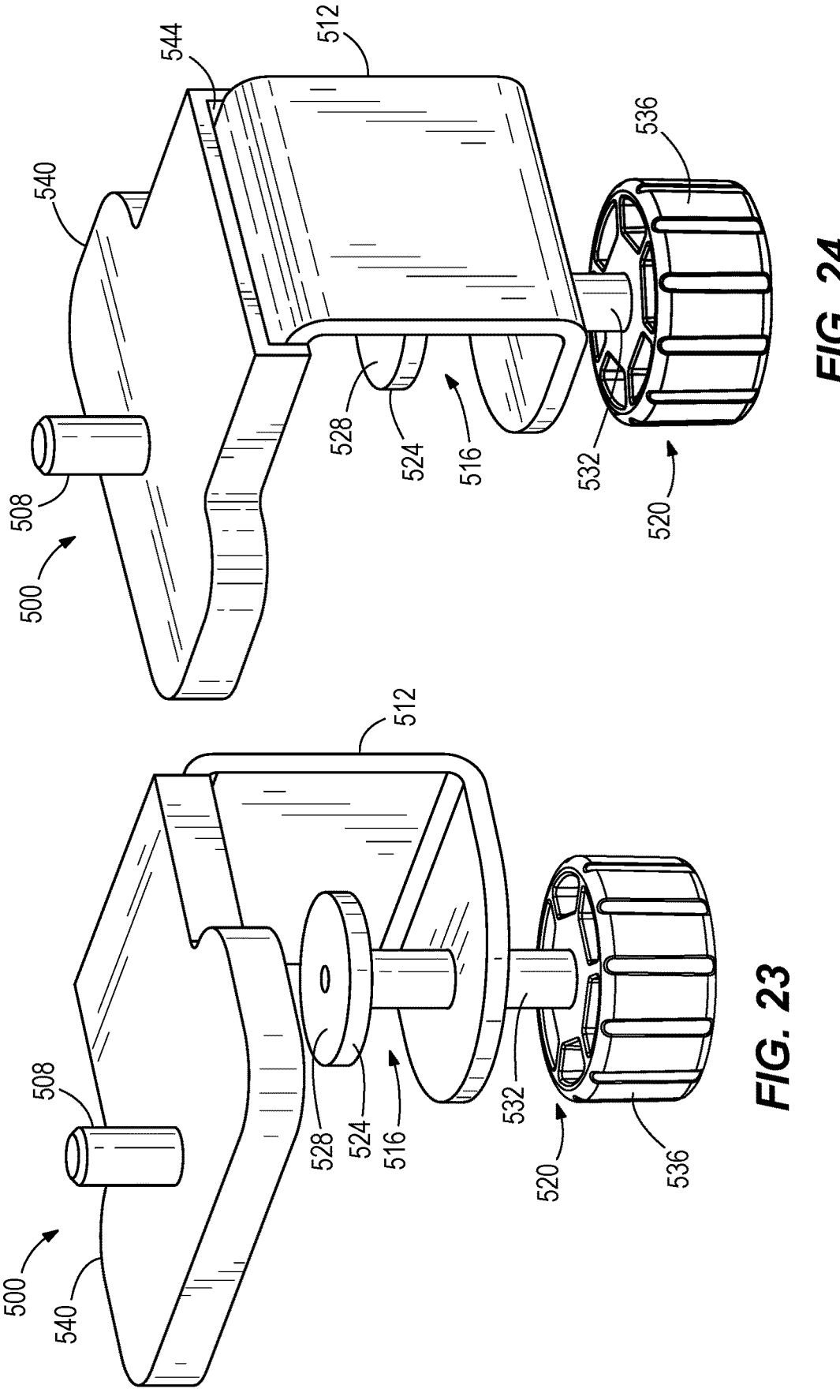
FIG. 23 is a perspective view of another embodiment of a clamp for connecting an adjustable support to a base.
FIG. 24 is a rear perspective view of the clamp of FIG. 23.
Figure 25:
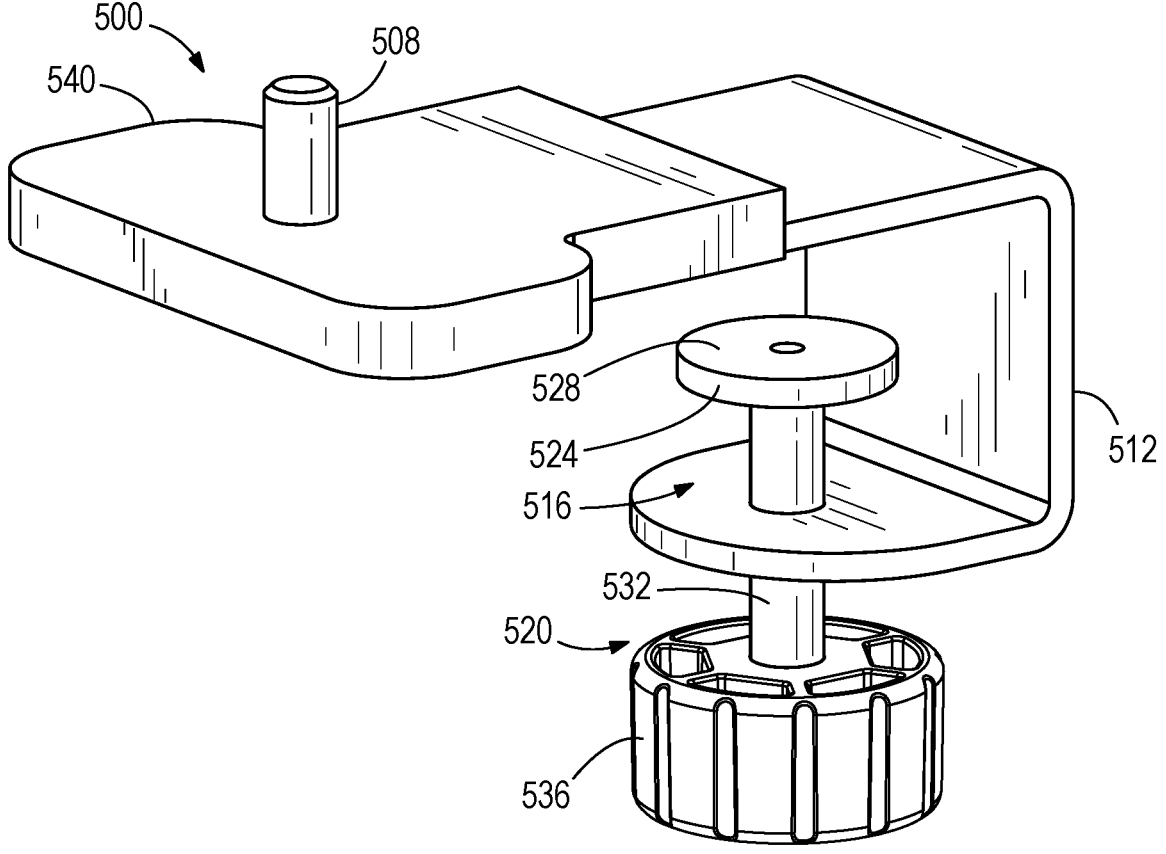
FIG. 25 is a perspective view of the clamp of FIG. 23 in an extended position.
Figure 26:
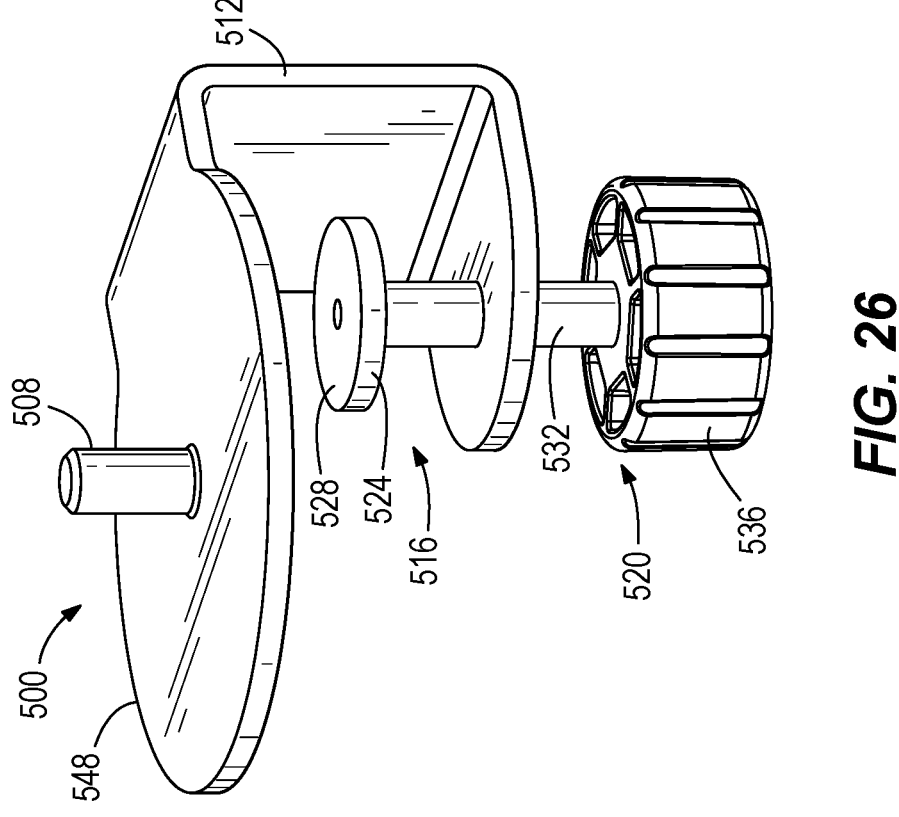
FIG. 26 is a perspective view of another embodiment of a clamp for connecting an adjustable support to a base.

With reference to FIGS. 23 and 24, in other embodiments, the clamp 500 further includes a tab 540. The tab 540 may also be referred to as an extendable tab. The tab 540 defines a slot 544 that receives the bracket 512 of the clamp 500. During installation, the clamp pin 508 is used to secure the tab 178 to the post 14, 214, and 414. In operation, the adjustable support may be movable in a forward or rearward direction relative to the base 12. The tab 540 is movable between a retracted configuration and an extended configuration (FIGS. 23 and 25). The tab 540 is movable to the extended configuration such that the adjustable support is located at a first distance relative to an edge of a desk or table. The tab 540 is also movable to a retracted configuration such that the adjustable support is located at a second distance relative to an edge of a desk or table. The first distance is greater than the second distance. The tab 540 allows for further adjustability of the adjustable support to provide a full ergonomic solution to improve productivity.

As shown in FIG. 25, in other embodiments, the bracket 512 of the clamp 500 also includes a disk 548. The disk 548 may also be referred to as a swivel disk. In the illustrated embodiment, the disk 548 is integrally formed with the bracket 512. In other embodiments, the disk 548 is separately formed and attached to the bracket 512 by bonding, welding, fastening, or other connection means. The clamp pin 508 is used to secure the disk 548 to the post 14, 214, and 414. The disk 548 allows for further adjustability of the adjustable support to provide a full ergonomic solution to improve productivity.

During installation, the post 14, 214, and 414 is attached to the disk 548. In operation, the adjustable support is rotatable relative to the base 12. The adjustable support is rotatable 360 degrees relative to the base 12. In other embodiments, the adjustable support may rotate 45 degrees, 90 degrees, 120 degrees, 180 degrees, or 270 degrees relative to the base 12. Still, in other embodiments, the adjustable support may rotate 45 to 360 degrees relative to the base 12.

Although the invention has been described in detail with reference to certain preferred embodiments, variations and modifications exist within the scope and spirit of one or more independent aspects of the invention as described.

Various features of the invention are set forth in the following claims.

What is claimed is:

1. An adjustable support for an electronic device comprising:

a platform configured to support the electronic device;

a post extending between a first end and a second end;

a linkage assembly movably supporting the platform on the post, the linkage assembly including a plurality of movable linkages configured to adjust a tilt of the platform to a plurality of different tilt angles, wherein the linkage assembly is configured to maintain a center of gravity of the platform and the electronic device along a linear path as the tilt of the platform is adjusted, wherein the linkage assembly includes a first arm and a second arm rotatably coupled to a carrier, and wherein the carrier is positioned within a hollow portion of the post, and wherein the carrier is slidable along a longitudinal axis of the post to adjust the height of the platform.

2. The adjustable support of claim 1, wherein the linkage assembly is configured to maintain the tilt angle of the platform based on an equilibrium of forces.

3. The adjustable support of claim 1, wherein the linkage assembly includes a four bar linkage assembly connected in a closed loop.

4. The adjustable support of claim 1, wherein the carrier includes a one or more friction blocks engaged with the first the second arms to control rotation of the first the second arms.

5. The adjustable support of claim 4, wherein at least one of the first arm and the second arm include teeth, and wherein the carrier further includes an index key engagable with the teeth to create tactile feedback.

6. The adjustable support of claim 4, wherein the linkage assembly further includes a mounting plate coupled to the platform, the first arm and the second arm extending between the mounting plate and the carrier.

7. The adjustable support of claim 4, wherein the second arm is a y-shaped arm having a first limb and a second limb, and wherein the first arm is configured to nest between the first and second limb when the linkage assembly is in a collapsed position.

8. An adjustable support for an electronic device comprising:

a platform configured to support the electronic device;

a post extending between a first end and a second end;

a linkage assembly movably supporting the platform on the post, the linkage assembly slidably coupled to the post to adjust a height of the platform, the linkage assembly including a plurality of movable linkages configured to adjust a tilt of the platform to a plurality of different tilt angles, wherein the tilt of the platform is maintained based on an equilibrium of forces through the linkage assembly to maintain a center of gravity of the platform and the electronic device along a linear path, and wherein the linkage assembly includes a carrier positioned within the post, a first arm rotatably coupled to the carrier, and a second arm rotatably coupled to the carrier, and wherein the carrier includes one or more friction block providing a frictional force on the first and second arms to control the rotation of the first and second arms.

9. The adjustable support of claim 8, wherein both the tilt of the platform and the height of the platform are maintained based on frictional forces.

10. The adjustable support of claim 8, wherein the carrier is slidable along a longitudinal axis of the post to adjust the height of the platform, and wherein the carrier includes a friction grip to control the sliding movement of the carrier within the post.

11. An adjustable support for an electronic device comprising:

a platform configured to support the electronic device;

a post extending between a first end and a second end;

a linkage assembly movably supporting the platform on the post, the linkage assembly slidable along a longitudinal axis of the post to adjust the height of the platform, the linkage assembly including a friction grip that allows the linkage assembly to be freely moveable in an upward direction and restricted from movement in a downward direction until an applied force overcomes a frictional force provided by the friction grip, the friction grip including a one-way bearing, wherein the post includes a rack having a plurality of teeth, and wherein the friction grip includes a pinion engagable with the rack to control movement of the linkage assembly along the longitudinal direction.

12. The adjustable support of claim 11, wherein the one way bearing allows the pinion to freely rotate in a first direction and restricts the pinion from rotating in a second direction until an applied force overcomes the force of the one way bearing.

13. The adjustable support of claim 11, wherein the post further includes a track and wherein the linkage assembly further includes a rail slidably engagable with the track to guide movement of the linkage assembly along the longitudinal axis.

* * * * *